(12) United States Patent
Albert et al.

(10) Patent No.: US 8,298,679 B2
(45) Date of Patent: Oct. 30, 2012

(54) AQUEOUS SILANE SYSTEMS BASED ON BIS(TRIALKOXYSILYLALKYL)AMINES

(75) Inventors: Philipp Albert, Loerrach (DE);
Eckhard Just, Rheinfelden (DE);
Christian Wassmer, Hausen (DE);
Burkhard Standke, Loerrach (DE)

(73) Assignee: Evonik Degussa GmbH, Essen (DE)

( * ) Notice: Subject to any disclaimer, the term of this patent is extended or adjusted under 35 U.S.C. 154(b) by 415 days.

(21) Appl. No.: 12/674,271

(22) PCT Filed: Jul. 2, 2008

(86) PCT No.: PCT/EP2008/058509
§ 371 (c)(1),
(2), (4) Date: Feb. 19, 2010

(87) PCT Pub. No.: WO2009/030538
PCT Pub. Date: Mar. 12, 2009

(65) Prior Publication Data
US 2011/0268899 A1    Nov. 3, 2011

(30) Foreign Application Priority Data

Aug. 28, 2007  (DE) .................. 10 2007 040 807
Feb. 1, 2008   (DE) .................. 10 2008 007 261

(51) Int. Cl.
*B32B 9/04* (2006.01)

(52) U.S. Cl. ............ 428/447; 428/450; 428/451; 106/2; 106/14.15; 106/287.1; 106/287.11; 427/140; 427/142; 427/407.1; 524/588; 528/10; 528/38; 528/33; 528/31

(58) Field of Classification Search .............. 428/447, 428/450, 451; 106/2, 14.15, 287.1, 287.11; 427/140, 142, 407.1; 524/588; 528/10, 38, 528/33, 31

See application file for complete search history.

(56) References Cited

U.S. PATENT DOCUMENTS

| | | |
|---|---|---|
| 5,629,400 A | 5/1997 | Standke et al. |
| 5,679,147 A | 10/1997 | Standke et al. |
| 5,808,125 A | 9/1998 | Standke et al. |
| 5,849,942 A | 12/1998 | Standke et al. |
| 5,863,509 A | 1/1999 | Standke et al. |
| 5,885,341 A | 3/1999 | Standke et al. |
| 5,932,757 A | 8/1999 | Standke et al. |
| 6,020,448 A | 2/2000 | Jenkner et al. |
| 6,054,601 A | 4/2000 | Standke et al. |
| 6,133,466 A | 10/2000 | Edelmann et al. |
| 6,176,918 B1 | 1/2001 | Glausch et al. |
| 6,177,582 B1 | 1/2001 | Jenkner et al. |
| 6,228,936 B1 | 5/2001 | Standke et al. |

(Continued)

FOREIGN PATENT DOCUMENTS

DE    103 35 178    3/2005

(Continued)

OTHER PUBLICATIONS

U.S. Appl. No. 13/257,488, filed Oct. 21, 2011, Standke, et al.

(Continued)

*Primary Examiner* — Michael C Miggins
(74) *Attorney, Agent, or Firm* — Oblon, Spivak, McClelland, Maier & Neustadt, L.L.P.

(57) ABSTRACT

The invention relates to an aqueous composition of bis-amino-functional silicon compounds which is essentially free of organic solvents and releases essentially no further alcohol in the course of crosslinking, and to processes for preparing it and to the use thereof, for example for hydrophobization of metal or glass surfaces.

78 Claims, 2 Drawing Sheets

U.S. PATENT DOCUMENTS

| Patent No. | Date | Inventor |
|---|---|---|
| 6,239,194 B1 | 5/2001 | Standke et al. |
| 6,251,989 B1 | 6/2001 | Edelmann et al. |
| 6,255,513 B1 | 7/2001 | Standke et al. |
| 6,288,256 B1 | 9/2001 | Standke et al. |
| 6,361,871 B1 | 3/2002 | Jenkner et al. |
| 6,395,858 B1 | 5/2002 | Mack et al. |
| 6,491,838 B1 | 12/2002 | Standke et al. |
| 6,534,667 B1 | 3/2003 | Standke et al. |
| 6,641,870 B2 | 11/2003 | Bartkowiak et al. |
| 6,663,683 B2 | 12/2003 | Lortz et al. |
| 6,676,719 B2 | 1/2004 | Lortz et al. |
| 6,685,766 B2 | 2/2004 | Standke et al. |
| 6,713,186 B1 | 3/2004 | Jenkner et al. |
| 6,767,377 B2 | 7/2004 | Schumacher et al. |
| 6,767,982 B2 | 7/2004 | Standke et al. |
| 6,773,697 B2 | 8/2004 | Hemme et al. |
| 6,773,814 B2 | 8/2004 | Schumacher et al. |
| 6,808,769 B2 | 10/2004 | Batz-Sohn et al. |
| 6,841,197 B2 | 1/2005 | Standke et al. |
| 6,905,632 B2 | 6/2005 | Lortz et al. |
| 6,955,728 B1 | 10/2005 | van Ooij et al. |
| 6,991,190 B2 | 1/2006 | Lortz et al. |
| 7,015,270 B2 | 3/2006 | Scharfe et al. |
| 7,083,769 B2 | 8/2006 | Moerters et al. |
| 7,244,302 B2 | 7/2007 | Schumacher et al. |
| 7,255,735 B2 | 8/2007 | Meyer et al. |
| 7,374,787 B2 | 5/2008 | Lortz et al. |
| 7,399,487 B2 | 7/2008 | Batz-Sohn et al. |
| 7,427,442 B2 | 9/2008 | Albert et al. |
| 7,470,423 B2 | 12/2008 | Lortz et al. |
| 7,538,142 B2 | 5/2009 | Lortz et al. |
| 7,572,854 B2 | 8/2009 | Schneider et al. |
| 7,578,877 B2 | 8/2009 | Giessler et al. |
| 7,598,409 B2 | 10/2009 | Just et al. |
| 7,611,753 B2 | 11/2009 | Bartkowiak et al. |
| 7,615,577 B2 | 11/2009 | Lortz et al. |
| 7,645,335 B2 | 1/2010 | Lortz et al. |
| 7,666,257 B2 | 2/2010 | Giessler-Blank et al. |
| 7,670,422 B2 | 3/2010 | Giessler-Blank et al. |
| 7,749,322 B2 | 7/2010 | Schumacher et al. |
| 7,780,777 B2 | 8/2010 | Perlet et al. |
| 7,815,936 B2 | 10/2010 | Hasenzahl et al. |
| 7,834,073 B2 | 11/2010 | Standke et al. |
| 7,976,719 B2 | 7/2011 | Batz-Sohn et al. |
| 8,012,367 B2 | 9/2011 | Hasenzahl et al. |
| 2002/0197311 A1 | 12/2002 | Hasenzahl et al. |
| 2003/0049486 A1 | 3/2003 | Ooji et al. |
| 2003/0108580 A1 | 6/2003 | Hasenzahl et al. |
| 2003/0228271 A1 | 12/2003 | Batz-Sohn et al. |
| 2004/0240062 A1 | 12/2004 | Lortz et al. |
| 2005/0058843 A1 | 3/2005 | van Ooij et al. |
| 2005/0169861 A1 | 8/2005 | Lortz et al. |
| 2005/0265934 A1 | 12/2005 | Schumacher et al. |
| 2006/0104881 A1 | 5/2006 | Lortz et al. |
| 2006/0159635 A1 | 7/2006 | Meyer et al. |
| 2006/0159636 A1 | 7/2006 | Meyer et al. |
| 2006/0159637 A1 | 7/2006 | Meyer et al. |
| 2006/0163533 A1 | 7/2006 | Batz-Sohn et al. |
| 2006/0229210 A1 | 10/2006 | Neugebauer et al. |
| 2006/0292192 A1 | 12/2006 | Hasenzahl et al. |
| 2007/0054056 A1 | 3/2007 | Albert et al. |
| 2007/0110906 A1 | 5/2007 | Edelmann et al. |
| 2007/0231280 A1 | 10/2007 | Schumacher et al. |
| 2007/0297998 A1 | 12/2007 | Meyer et al. |
| 2008/0058489 A1 | 3/2008 | Edelmann et al. |
| 2008/0095724 A1 | 4/2008 | Hasenzahl et al. |
| 2008/0187673 A1 | 8/2008 | Standke et al. |
| 2008/0188617 A1 | 8/2008 | Standke et al. |
| 2008/0206572 A1 | 8/2008 | Edelmann et al. |
| 2008/0213325 A1 | 9/2008 | Schumacher et al. |
| 2008/0221318 A1 | 9/2008 | Edelmann et al. |
| 2008/0233341 A1 | 9/2008 | Jenkner et al. |
| 2008/0249237 A1 | 10/2008 | Hager et al. |
| 2008/0264299 A1 | 10/2008 | Lortz et al. |
| 2009/0005518 A1 | 1/2009 | Just et al. |
| 2009/0007818 A1 | 1/2009 | Militz et al. |
| 2009/0022898 A1 | 1/2009 | Standke et al. |
| 2009/0030162 A1 | 1/2009 | Mueh et al. |
| 2009/0047225 A1 | 2/2009 | Hasenzahl et al. |
| 2009/0069464 A1 | 3/2009 | Standke |
| 2009/0131694 A1 | 5/2009 | Schumacher et al. |
| 2009/0186053 A1 | 7/2009 | Meyer et al. |
| 2009/0261309 A1 | 10/2009 | Lortz et al. |
| 2010/0117021 A1 | 5/2010 | Batz-Sohn et al. |
| 2010/0119851 A1 | 5/2010 | Giessler-Blank et al. |
| 2010/0209339 A1 | 8/2010 | Schumacher et al. |
| 2010/0233392 A1 | 9/2010 | Batz-Sohn et al. |
| 2010/0308287 A1 | 12/2010 | Lortz et al. |
| 2011/0144226 A1 | 6/2011 | Spyrou et al. |
| 2011/0178238 A1 | 7/2011 | Koschabek et al. |
| 2011/0268899 A1 | 11/2011 | Albert et al. |

FOREIGN PATENT DOCUMENTS

| | | |
|---|---|---|
| EP | 0 716 127 | 6/1996 |
| EP | 1 031 593 | 8/2000 |
| WO | 00 39177 | 7/2000 |
| WO | 2005 014741 | 2/2005 |

OTHER PUBLICATIONS

U.S. Appl. No. 13/256,557, filed Sep. 14, 2011, Scharfe, et al.
U.S. Appl. No. 13/062,225, filed May 16, 2011, Weissenbach, et al.
U.S. Appl. No. 13/258,724, filed Sep. 22, 2011, Albert, et al.
U.S. Appl. No. 11/572,688, filed Jan. 25, 2007, Edelmann, et al.
U.S. Appl. No. 12/673,390, filed Feb. 16, 2010, Wassmer, et al.
U.S. Appl. No. 12/674,271, filed Feb. 19, 2010, Albert, et al.
U.S. Appl. No. 12/674,601, filed Feb. 22, 2010, Jenkner, et al.
U.S. Appl. No. 12/161,112, filed Jul. 16, 2008, Standke, et al.
U.S. Appl. No. 12/678,299, filed Mar. 16, 2010, Borup, et al.
U.S. Appl. No. 13/389,561, filed Feb. 8, 2012, Albert, et al.

AQUEOUS SILANE SYSTEMS BASED ON BIS(TRIALKOXYSILYLALKYL)AMINES

The invention relates to an aqueous composition of bis-aminofunctional silicon compounds which is substantially free of organic solvents and releases substantially no more alcohol even on crosslinking, and to processes for the preparation thereof as well as the use thereof, for example for the hydrophobization or oleophobization of metal or glass surfaces.

Aqueous silane systems which contain less or no organic solvents and are therefore more environmentally friendly are attracting increasing interest. However, stable, aqueous silane systems cannot be prepared simply by mixing silanes with water, since many silanes are not soluble in the aqueous phase and hydrolyze and condense on contact with water.

For example, DE 10 2005 004 872 A1 describes the preparation of aqueous oil-in-water emulsions based on alkoxysilanes and of the condensed polymers thereof in the presence of an emulsifier. The emulsion is prepared in a high-pressure homogenizer. The aqueous emulsions are used in the surface treatment of, for example, porous, mineral building materials. During use, alcohols are still released as a result of the hydrolysis.

The preparation of water-soluble aminopolysiloxanes is described in EP 0 590 270 A2. The aminosilanes, in a 50% strength alcoholic solution, are mixed with a corresponding amount of water which corresponds to the 0.25- to 4-fold molar silicon content of the silanes used and are partly hydrolyzed at 60° C. Under the process conditions mentioned, precipitations occur on use of relatively large amounts of water in the synthesis of the hydrolysis products. The products obtained are then soluble in water. The high content of organic solvents and the associated low flashpoint are disadvantageous. The curing of a dilute aqueous polysiloxane mixture takes place at 80° C.

DE 103 35 178 A1 discloses the preparation of water-dilutable silane systems, for example of a mixture of 3-aminopropyltrialkoxysilane and bis(trialkoxysilylpropyl)amine in alcoholic solvents. This silane mixture is partly hydrolyzed with a defined molar amount of water. The silane mixture having an alcohol content of from 25 to 99.99% is not free of VOC (volatile organic compound).

U.S. Pat. No. 5,051,129 discloses a composition of an aqueous solution of a water-soluble aminosilane and an alkyltrialkoxysilane. The preparation is effected by addition of a defined amount of water to the silane mixture and subsequent heating at 60° C. The silane mixture thus prepared is dissolved in a certain ratio in water and serves for the hydrophobization of surfaces.

EP 0 716 128 A1 discloses water-based organopolysiloxane-containing compositions, processes for the preparation thereof as well as the use thereof. By mixing of water-soluble aminoalkylalkoxysilanes with alkyltrialkoxysilanes and/or dialkyldialkoxysilanes and addition of water at a defined pH, organopolysiloxane-containing compositions form. The resulting hydrolysis alcohol is removed by distillation. VOC-free aqueous polysiloxane-containing compositions which can be used for the hydrophobization of surfaces, mineral building materials and further applications are therefore obtained.

Aqueous silane systems consisting of reaction products of the reaction of aminoalkyltrialkoxysilanes and bissilylaminosilanes are disclosed in EP 1 031 593 A2. These aqueous solutions, based only on the hydrolysis of bissilylaminosilanes, are said to be not capable of application since they tend to gel and flocculate.

WO 00/39177 A2 describes the use of bissilylaminosilanes and/or bissilylpolysulfanes in aqueous, alcohol-containing solutions. The silanes are mixed with water, an alcohol and optionally acetic acid and hydrolyzed for at least 24 h. This is followed by use on metals.

U.S. Pat. No. 6,955,728 B1 describes the use of acetoxysilanes in combination with other silanes in aqueous solutions and the use on metals. Inter alia, bis(trialkoxysilylpropyl)amines are also used in combination with acetoxysilanes. Nothing is stated concerning the stability of the aqueous solutions. Unhydrolyzed concentrates in the form of a two-component system or an anhydrous, premixed concentrate are recommended for sale, in order to suppress condensation of the silanes. The aqueous solutions always contain the hydrolysis alcohol after mixing.

WO 2006/010666 A1 relates to aqueous systems of block cocondensates which are prepared from alkyltrialkoxysilanes and a cocondensate of a fluorinated silane with an aminosilane and optionally a cocondensate of an aminosilane with an alkylsilane.

In WO 2004/076717 A1, bissilylaminosilanes are used in combination with further silanes and a metal chelate in aqueous solutions. The silanes are partly hydrolyzed by aging for at least two weeks in aqueous concentrates. Thereafter, a metal chelate is added and further dilution is effected with water. In addition, all aqueous formulations still contain the alcohol from the hydrolysis. The aqueous systems are used for the pretreatment of metal surfaces.

WO 2004/076718 A1 relates to a process for coating a metallic surface with an aqueous solution which contains a partly hydrolyzed silane such as, for example, bissilylaminosilane, and a partly hydrolyzed fluorine-containing silane. By using the fluorine-containing silane, the water repellency and the corrosion resistance of the coating system are improved. The hydrolysis alcohol is not removed from the systems.

U.S. Pat. No. 5,206,285 describes the preparation and use of water-based addition products of an epoxysilane and a primary aminosilane. The aqueous silane systems are not solvent-free. They are used for metal coating and are said to improve the corrosion resistance.

EP 1 760 128 A1 discloses an aqueous adhesion promoter composition consisting of two components, one of the components comprising organosiloxanes without Si—O—Si bonds and an anhydrous surfactant and the second component being aqueous. Furthermore, the use thereof in processes for adhesive bonding or sealing is claimed. One component of the adhesion promoter may contain a bissilylaminosilane.

DE 10 2004 037 045 A1 claims aqueous silane nanocomposites which are prepared from glycidyloxypropylalkoxysilanes and aqueous silica sols in the presence of a hydrolysis catalyst. The aqueous systems are virtually solvent-free and are suitable for metal coatings. The high crosslinking temperatures of 200° C. are disadvantageous.

It was an object of the present invention to provide aqueous and VOC-free compositions based on bis-aminofunctional alkoxysilanes, which compositions have a variety of uses, in particular have good hydrophobic, corrosion-protecting and/or priming properties and preferably crosslink at low temperatures.

The object is achieved according to the patent claims.

Surprisingly, it was found that stable aqueous, substantially alcohol-free compositions based on silicon compounds can be obtained from bis-aminofunctional alkoxysilanes with organofunctional alkoxysilanes, in particular with alkyl-functional alkoxysilanes, the silicon compounds being present in particular in substantially completely hydrolyzed form. Moreover, these compositions crosslink at low temperatures.

Crosslinking is understood as meaning the condensation of the silicon compounds with one another, and in particular the condensation with functionalities of substrates. As a result, and optionally through interactions or reactions, such as, for example, complex formation, of the amino functions of the silicon compounds with functionalities of substrates, stable layers resistant to boiling water form.

When applied to a glass sheet, metal surface or other substrate surfaces, the composition containing cocondensates crosslinks rapidly with the substrate and forms a hydrophobic layer of high strength. Thus, the silane systems crosslinked at room temperature do not become detached again from the glass or metal surface, even in boiling water. Silane systems based on cocondensates of bis-aminofunctional alkoxysilanes, such as bis(triethoxysilane)amine or bis(trimethoxysilane)amine, with n-propyltriethoxysilane, n-propyltrimethoxysilane (PTMO), 3-glycidyloxypropyltriethoxysilane (GLYEO), 3-glycidyloxypropyltrimethoxysilane (GLYMO), 3-aminopropyltriethoxysilane (AMEO), 3-aminopropyltrimethoxysilane (AMMO), methacryloxypropyltriethoxysilane (MEEO), methacryloxypropyltrimethoxysilane (MEMO), N-(n-butyl)-3-aminopropyltriethoxysilane, vinyltrimethoxysilane (VTMO), N-(n-butyl)-3-aminopropyltrimethoxysilane (Dynasylan® 1189), 3-mercaptopropyltrimethoxysilane (MTMO), 3-mercaptopropyltriethoxysilane (MTEO), N-2-aminoethyl-3-aminopropyltrimethoxysilanes (DAMO), polyethylene glycol-functionalized alkoxysilanes, tetraethoxysilane (Dynasylan A), tetramethoxysilane (Dynasylan M), methyltriethoxysilane (MTES), methyltrimethoxysilane (MTMS), bis(triethoxysilylpropyl)tetrasulfane (Si 69), bis(triethoxysilylpropyl)disulfane (Si 266), bis(trimethoxysilylpropyl)disulfane, bis(trimethoxysilylpropyl) tetrasulfane, vinyltriethoxysilane (VTEO), 1-aminomethyltriethoxysilyne, 1-aminomethyltrimethoxysilyne, 1-methacryloxymethyltrimethoxysilane, 1-methacryloxymethyltriethoxysilane, 1-mercaptomethyltriethoxysilane, 1-mercaptomethyltrimethoxysilane, isobutyltrimethoxysilane, isobutyltriethoxysilane, octyltriethoxysilane (Dynasylan® OTEO), octyltrimethoxysilane, hexadecyltriethoxysilane, hexadecyltrimethoxysilane, phenyltrimethoxysilane, phenyltriethoxysilane, 2-aminoethyl-3-aminopropylmethyldimethoxysilanes, 2-aminoethyl-3-aminopropylmethyldiethoxysilanes, ureidopropyltrimethoxysilane, ureidopropyltriethoxysilane, tridecafluorooctyltriethoxysilane, tridecafluorooctyltrimethoxysilane, Dynasylan® 1151 (alcohol-free aminosilane hydrolysis product), Dynasylan® HS 2627 (alcohol-free cocondensate of aminosilane and alkylsilane), Dynasylan® HS 2776 (aqueous, alcohol-free cocondensate of diaminosilane and alkylsilane), Dynasylan® HS 2909 (aqueous, alcohol-free cocondensate of aminosilane and alkylsilane), Dynasylan® HS 2926 (aqueous, alcohol-free product based on epoxysilane), Dynasylan® SIVO 110 (aqueous, alcohol-free product of epoxysilane), also have this high strength on a substrate layer.

It is of particular relevance that the water repellency and reactivity of the cured surface can be adjusted in a targeted manner via the special combination of the silanes. However, a precondition is always the presence of at least one bis-aminofunctional compound or the hydrolysis products and/or condensates thereof in the substantially solvent-free composition, such as, for example, of bis(trialkoxysilane)amine, in order to obtain the low curing temperature. Even aqueous silane systems based on differently substituted alkoxysilanes therefore cure at low temperatures provided that a bis-aminofunctional compound is present as further component. Aqueous silane systems which cure at room temperature, i.e. in particular crosslinked with the reactive functionalities of the substrate surface and/or undergo interactions or reactions and form stable oleophobic surfaces, can even be prepared by cocondensation with fluorosilanes.

According to one embodiment, it is possible positively to modify the product properties of these silane systems by use of the aqueous, substantially solvent-free composition according to the invention, containing bis-aminofunctional silicon compounds, together in mixtures with further silane systems. For example, the curing temperature of these silane systems can be reduced without a disadvantageous influence on the performance.

The range of use of the aqueous silane systems according to the invention is very varied; thus, they can be used as water repellents on a very wide range of substrates, such as, for example, glass or concrete, brick, sandstone, etc. In the combination with fluorosilanes—as cocondensate or mixture—it is also possible to obtain substrates having additionally oleophobic and antigraffiti and/or antifingerprint properties. Further fields of use are in the priming of substrate surfaces, such as, for example, glass, metal, concrete, sandstone, brick and further inorganic substrates, etc. By the priming of, for example, metal surfaces, the adhesion of the topcoat and hence also improved corrosion protection are achieved. Furthermore, the aqueous silane systems based on bis-aminofunctional silane compounds can also be used for rock consolidation or in aqueous coating formulations.

The below-mentioned contents in % by weight in the composition (end product) reflect the proportion of the alkoxysilane compound(s) used prior to the reaction according to the invention and removal of the hydrolysis alcohol from the reaction mixture.

Compositions according to the invention, also referred to below as silane systems, contain substantially water-soluble bis-aminofunctional silicon compounds, in particular silicon compounds substantially free of alkoxy groups, and water; in particular, the silicon compounds are derived from alkoxysilanes and have crosslinking structural elements which form chain-like, cyclic, crosslinked and/or three-dimensionally crosslinked structures, for example at least one structure in idealized form corresponding to the general formula I or being capable of being represented according to the idealized formula I, cf. also scheme I, $(R^2O)[(R^2O)_{1-x}(R^3)_x(Si(B)O]_b[(Y)_2Si(A)Si(Y)_2O]_a[Si(C)(R^5)_y(OR^4)_{1-y}O]_c[Si(D)(R^7)_u(OR^6)_{1-u}O]_d[Si(E)(R^8)_v(OR^9)_{1-v}O]_wR^9.(HX)_e$ (I), in the structural elements derived from alkoxysilanes, A corresponding to a bisaminoalkyl radical,
B corresponding to an aminoalkyl radical,
C corresponding to an alkyl radical,
D corresponding to an epoxy or ether radical and
E corresponding to an organofunctional radical,
Y corresponding to $OR^1$ or, in crosslinked and/or three-dimensionally crosslinked structures, independently of one another, $OR^1$ or $O_{1/2}$,
$R^1$, $R^2$, $R^4$, $R^6$ and/or $R^9$ substantially corresponding to hydrogen and $R^3$, $R^5$, $R^7$ and/or $R^8$ corresponding to organofunctional radicals,
HX being an acid, in which X is an inorganic or organic acid radical,
with $0 \leq x \leq 1$, $0 \leq y \leq 1$, $0 \leq u \leq 1$, $a \geq 1$, $b \geq 0$, $c \geq 0$, $d \geq 0$, $w \geq 0$, $e \geq 0$, in particular e being $\geq 1$, and $(a+b+c+d+w) \geq 2$, the composition being substantially free of organic solvents and releasing substantially no more alcohol on crosslinking;
in particular it has a flashpoint above 90° C.

Here, a structural element, a monomeric siloxane unit or bissiloxane unit is understood as meaning the individual structural unit M, D, T or Q, i.e. the alkoxy-substituted silane, the hydrolyzed silane formed therefrom and/or the condensate. According to the invention, the structural elements, in particular the following structural elements $(R^2O)[(R^2O)_{1-x}(R^3)_xSi(B)O]_b$, $[(R^2O)_{1-x}(R^3)_xSi(B)O]_b$, $[(Y)_2Si(A)Si(Y)_2O]_a$, $(Y)[(Y)_2Si(A)Si(Y)_2O]_a$, $[Si(C)(R^5)_y(OR^4)_{1-y}O]_c$, $[Si(C)(R^5)_y(OR^4)_{1-y}O]R^4_c$, $[Si(D)(R^7)_u(OR^6)_{1-u}O]_d$, $[Si(D)(R^7)_u(OR^6)_{1-u}O]R^6_d$, $[Si(E)(R^8)_v(OR^9)_{1-v}O]_w$ and/or $[Si(E)(R^8)_v(OR^9)_{1-v}O]_wR^9$, form chain-like, cyclic, crosslinked and/or three-dimensionally crosslinked structures having a random and/or irregular distribution of the structural elements and/or block condensates of the structural elements, cf. for example Scheme I. The general formula I does not represent the structure or composition actually present. It corresponds to an idealized possible representation. The composition preferably contains silicon compounds which result from random and/or irregular cohydrolysis and/or cocondensation and/or block condensation of said structural elements, based on the alkoxysilanes substituted according to the invention by A, B, C, D or E radicals, and/or form under the chosen experimental conditions.

The substitution pattern also applies correspondingly to the chain-like, cyclic, crosslinked and/or three-dimensionally crosslinked silane systems/silicon compounds not shown in idealized form, Y corresponding to an $OR^1$ or, in crosslinked and/or three-dimensionally crosslinked structures, independently of one another, $OR^1$ or $O_{1/2}$—in a siloxane bond—, $R^1$, $R^2$, $R^4$, $R^6$ and/or $R^9$ corresponding substantially to hydrogen, it being possible for siloxane bonds with $O_{1/2}$ to be formed also from the radicals $OR^2$, $OR^4$, $OR^6$ and/or $OR^9$, in each case independently of one another, in crosslinked and/or three-dimensionally crosslinked structures, or these radicals, independently of one another, may be present as $O_{1/2}$ and $R^3$, $R^5$, $R^7$ and/or $R^8$ correspond to organofunctional radicals, A corresponds to a bisaminoalkyl radical, B corresponds to an aminoalkyl radical, C corresponds to an alkyl radical and D corresponds to an epoxy or ether radical and E corresponds to an organofunctional radical. In scheme I, possible idealized representational variants of the general formula I are shown by way of example, not definitively.

A composition which is substantially free of organic solvents is to be understood as meaning compositions which, apart from very low contents, no longer contain any organic solvents, in particular no alcohols, such as methanol, ethanol or propanol. By definition, the hydrolysis alcohol formed in the hydrolysis of the alkoxysilanes was also virtually completely removed from these compositions. A composition is considered to be substantially free of organic solvents, in particular free of alcohols and/or alkoxy groups, i.e. substantially no more alcohol is released even on crosslinking, if the content is less than 5% by weight, in particular less than 4% by weight, preferably below 2% by weight, in particular below 1% by weight, particularly preferably below 0.5% by weight or below 0.1% by weight. In particular, the content of the silicon compound is from 1 to 40% by weight, in particular from 5 to 40% by weight, preferably from 7.5 to 40% by weight, particularly preferably from 12.5 to 40% by weight.

Bis-aminofunctional compositions according to the invention contain at least one bis-aminofunctional structural element, based on a bis-aminofunctional silane of the formula II, and crosslink at temperatures from 0° C., in particular from 5° C., preferably from 5 to 30° C., particularly preferably from 15 to 25° C. Compositions having outstanding properties crosslink at from 5 to 30° C. within 24 hours, in particular within 12 hours, preferably within 2 hours.

Bis-aminofunctional compositions according to the invention contain at least one bis-aminofunctional structural element, based on a bis(trialkoxysilane)amine, the numerators of the structural elements being $b \geq 0$, $a \geq 1$, $c \geq 1$, $d \geq 0$, $w \geq 0$ and $e \geq 1$. Combinations of at least one bis(trialkoxysilylalkyl)amine, bis-N,N'-(trialkoxysilylalkyl)alkylenediamine and/or bis-N,N'-(trialkoxysilylalkyl)dialkylenetriamine, in particular of bis(triethoxysilylpropyl)amine $((H_5C_2O)_3Si(CH_2)_3NH(CH_2)_3Si(OC_2H_5)_3$, bis-AMEO), bis(trimethoxysilylpropyl)amine $((H_3CO)_3Si(CH_2)_3NH(CH_2)_3Si(OCH_3)_3$, bis-AMMO), bis-DAMO $((H_3CO)_3Si(CH_2)_3NH(CH_2)_2NH(CH_2)_3Si(OCH_3)_3)$ and/or bis-TRIAMO $((H_3CO)_3Si(CH_2)_3NH(CH_2)_2NH(CH_2)_2NH(CH_2)_3Si(OCH_3)_3)$, where bis(triethoxysilylpropyl)amine $((H_5C_2O)_3Si(CH_2)_3NH(CH_2)_3Si(OC_2H_5)_3$, bis-AMEO) is particularly preferred, with an alkylalkoxysilane, in particular with n-propyltriethoxysilane (PTEO), n-propyltrimethoxysilane (PTMO), dimethyldimethoxysilane (DMDMO), dimethyldiethoxysilane, n-octyltrialkoxysilane, isobutyltrimethoxysilane, isobutyltriethoxysilane, octyltriethoxysilane (Dynasylan® OTEO), octyltrimethoxysilane, hexadecyltriethoxysilane, hexadecyltrimethoxysilane, phenyltrimethoxysilane, phenyltriethoxysilane and/or methyltriethoxysilane, it being possible for the silanes to be both methoxy- and ethoxy-substituted, are preferred. Expedient weight ratios in which the starting materials are used relative to one another and are then accordingly also present in the Scheme I: Exemplary, not definitively represented, possible idealized variants of the general formula I

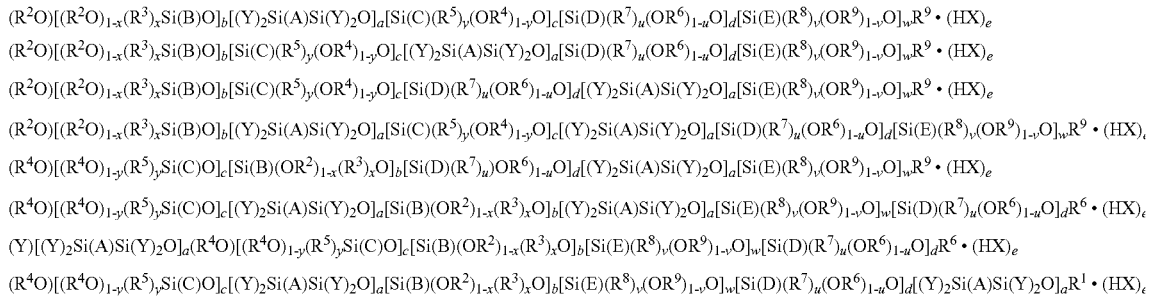

composition are from 3:1 to 1:2 for bis-aminofunctional silane to alkylfunctional silane.

Preferably, the silicon compounds are present with a total content of from 5 to 35% by weight or of from 7.5 to 35% by weight, in particular with from 12.5 to 35% by weight, preferably with from 15 to 35% by weight, particularly preferably with from 15 to 30% by weight, in the composition. A composition having a content of from 1 to 12.5% by weight, in particular from 1 to 7.5% by weight, of the silicon compound may also be expedient; this can be effected in particular by further dilution of the composition, for example shortly before the use thereof as an agent for the treatment and/or modification of substrates.

If the composition consists of silanes with $a \geq 1$ and b, c and d=0 or of silanes with $a \geq 1$ and $b \geq 1$ and c, d=0, the silicon compounds are preferably present with a total content of 12.5, preferably from 15 to 35% by weight, particularly preferably from 15 to 30% by weight, in the composition.

In general, all compositions are particularly stable if the pH is in the range from 1.0 to 5.4, in particular from 3.0 to 5.4, preferably from 3.0 to 4.8, particularly preferably from 3.5 to 4.8. In the substantially solvent-free compositions which release substantially no more alcohol even on crosslinking, the pH can also be expediently adjusted so that the silicon compounds are still water-soluble and/or stable. As a rule, this may be so up to a pH of about 6.0 or just above.

In the compositions according to the invention, A in a structural element, such as $[(Y)_2Si(A)Si(Y)_2O]_a$, in particular in the general formula I, corresponds to a bisaminoalkyl radical derived from the general formula II $$(OR^1)_3Si-A-Si(OR^1)_3 \qquad (II)$$

where A is a bis-aminofunctional group of the formula III

$$-(CH_2)_i-[NH(CH_2)_f]_gNH[(CH_2)_{f^*}NH]_{g^*}-(CH_2)_{i^*}- \qquad (III),$$

in which i, i*, f, f*, g or g* are identical or different, with i and/or i*=from 0 to 8, f and/or f*=1, 2 or 3, g and/or g*=0, 1 or 2 and $R^1$ corresponds to a linear, cyclic and/or branched alkyl radical having 1 to 4 C atoms, i and/or i* corresponding in particular to one of the numbers 1, 2, 3 or 4, preferably 3; particularly preferred is bis(triethoxysilylpropyl)amine $[(H_5C_2O)_3Si(CH_2)_3NH(CH_2)_3Si(OC_2H_5)_3$, bis-AMEO] where i, i*=3 and g, g*=0.

Further preferred bis-aminofunctional alkoxysilanes are: $(H_3CO)_3Si(CH_2)_3NH(CH_2)_3Si(OCH_3)_3$ (bis-AMMO), $(H_3CO)_3Si(CH_2)_3NH(CH_2)_2NH(CH_2)_3Si(OCH_3)_3$ (bis-DAMO), $(H_3CO)_3Si(CH_2)_3NH(CH_2)_2NH(CH_2)_2NH(CH_2)_3Si(OCH_3)_3$ (bis-TRIAMO), bis(diethoxymethylsilylpropyl)amine, bis(dimethoxymethylsilylpropyl)amine, bis(triethoxysilylmethyl)amine, bis(trimethoxysilylmethyl)amine, bis(diethoxymethylsilylmethyl)amine, bis(dimethoxymethylsilylmethyl)amine, $(H_3CO)_2(CH_3)Si(CH_2)_3NH(CH_2)_2NH(CH_2)_3Si(OCH_3)_2(CH_3)$ and/or $(H_3CO)_3(CH_3)Si(CH_2)_3NH(CH_2)_2NH(CH_2)_2NH(CH_2)_3Si(OCH_3)_2(CH_3)$.

In the compositions according to the invention, B in a structural element, such as $(R^2O)[(R^2O)_{1-x}(R^3)_xSi(B)O]_b$, in particular in the general formula I, corresponds to an aminofunctional radical derived from the general formula IV $$B-Si(R^3)_x(OR^2)_{3-x} \qquad (IV)$$

where x=0 or 1, $R^2$ corresponding to a linear and/or branched alkyl radical having 1 to 4 C atoms, $R^3$ corresponding to a linear, branched or cyclic alkyl radical having 1 to 12 C atoms and/or aryl radical and B corresponding to one of the following aminofunctional groups of the general formula Va or Vb

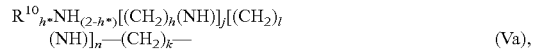

$$R^{10}{}_{h^*}NH_{(2-h^*)}[(CH_2)_n(NH)]_j[(CH_2)_l(NH)]_n-(CH_2)_k- \qquad (Va),$$

in which $0 \leq h \leq 6$; h*=0, 1 or 2; j=0, 1 or 2; $0 \leq l \leq 6$; n=0, 1 or 2; $0 \leq k \leq 6$ and $R^{10}$ corresponds to a benzyl, aryl, vinyl or formyl radical and/or to a linear, branched and/or cyclic alkyl radical having 1 to 8 C atoms, and/or

$$[NH_2(CH_2)_m]_2N(CH_2)_p- \qquad (Vb),$$

in which $0 \leq m \leq 6$ and $0 \leq p \leq 6$. Preferably, k=3, n=1 or 2, l=1, 2 or 3 and j=0, particularly preferably k=3, n=1 or 2, l=2 and j=0; m=2 and p=3 for an N,N-di(2-aminoethyl)-3-aminopropyl radical.

Examples of aminoalkylalkoxysilanes which can preferably be used are: aminopropyltrimethoxysilane ($H_2N(CH_2)_3Si(OCH_3)_3$, AMMO), aminopropyltriethoxysilane ($H_2N(CH_2)_3Si(OC_2H_5)_3$, AMEO), diaminoethylene-3-popyltrimethoxysilane ($H_2N(CH_2)_2NH(CH_2)_3Si(OCH_3)_3$, DAMO); triaminodiethylene-3-polytrimethoxysilane $H_2N(CH_2)_2NH(CH_2)_2NH(CH_2)_3Si(OCH_3)_3$ (TRIAMO), aminopropylmethyldiethoxysilane, aminopropylmethyldimethoxysilane, 2-aminoethyltrimethoxysilane, 2-aminoethylmethyldimethoxysilane, 2-aminoethylphenyldimethoxysilane, 2-aminoethyltriethoxysilane, 2-aminoethylmethyldiethoxysilane, 2-aminoethyltriethoxysilane, (2-aminoethylamino)ethyltriethoxysilane, 6-amino-n-hexyltriethoxysilane, 6-amino-n-hexyltrimethoxysilane, 6-amino-n-hexylmethyldimethoxysilane and in particular 3-amino-n-propyltrimethoxysilane, 3-amino-n-propylmethyldimethoxysilane, 3-amino-n-propyltriethoxysilane, 3-amino-n-propylmethyldiethoxysilane, 1-aminomethyltriethoxysilane, 1-aminomethylmethyldiethoxysilane, 1-aminomethyltrimethoxysilane, 1-aminomethylmethyldiethoxysilane, N-butyl-3-aminopropyltriethoxysilane, N-butyl-3-aminopropylmethyldiethoxysilane, N-butyl-3-aminopropyltrimethoxysilane, N-butyl-3-aminopropylmethyldimethoxysilane, N-butyl-1-aminomethyltriethoxysilane, N-butyl-1-aminomethylmethyldimethoxysilane, N-butyl-1-aminomethyltrimethoxysilane, N-butyl-1-aminomethylmethyltriethoxysilane, N-formyl-3-aminopropyltriethoxysilane, N-formyl-3-aminopropyltrimethoxysilane, N-formyl-1-aminomethylmethyldimethoxysilane and/or N-formyl-1-aminomethylmethyldiethoxysilane or mixtures thereof.

Furthermore, C in a structural element, for example in $[Si(C)(R^5)_y(OR^4)_{1-y}O]$, in the composition according to the invention, in particular in the general formula I, corresponds to an alkyl radical derived from the general formula VI

$$C-Si(R^5)_y(OR^4)_{3-y} \qquad (VI)$$

where y=0 or 1, C corresponding to a linear, branched or cyclic alkyl radical having 1 to 20 C atoms, $R^5$ corresponding to a linear, branched and/or cyclic alkyl radical having 1 to 12 C atoms and/or aryl radical, $R^4$ corresponding to a linear and/or branched alkyl radical having 1 to 4 C atoms. Preferably, y=0 or 1, C corresponding to a linear or branched alkyl radical having 1 to 8 C atoms, preferably to a methyl or ethyl radical, particularly preferably n-propyl, isopropyl or octyl radical, $R^5$ corresponding to a linear, branched or cyclic alkyl radical having 1 to 8 C atoms, preferably to a methyl or ethyl radical, particularly preferably n-propyl, isopropyl and/or octyl radical, $R^4$ corresponding to a linear and/or branched alkyl radical having 1 to 3 C atoms, particularly preferably to a methyl, ethyl and/or isopropyl or n-propyl radical.

Examples of these are: propyltrimethoxysilane (PTMO), dimethyldimethoxysilane (DMDMO), dimethyldiethoxysilane, methyltriethoxysilane (MTES), propylmethyldimethoxysilane, propylmethyldiethoxysilane, n-octylmethyldimethoxysilane, n-hexylmethyldimethoxysilane, n-hexylmethyldiethoxysilane, propylmethyldiethoxysilane, propylmethyldiethoxysilane, propyltriethoxysilane, isobutyltrimethoxysilane, isobutyltriethoxysilane, octyltrimethoxysilane, octyltriethoxysilane, n-hexyltriethoxysilane, cyclohexyltriethoxysilane, n-propyl-tri-n-butoxysilane, n-propyltrimethoxysilane, n-propyltriethoxysilane, isobutyltriethoxysilane, hexadecyltriethoxysilane, hexadecyltrimethoxysilane, octadecyltriethoxysilane, octadecyltrimethoxysilane, octadecylmethyldiethoxysilane, octadecylmethyldimethoxysilane, hexadecylmethyldimethoxysilane and/or hexadecylmethyldiethoxysilane and mixtures of these silanes.

In the compositions according to the invention, D in a structural element, for example in $[Si(D)(R^7)_u(OR^6)_{1-u}O]$, in particular in the general formula I, corresponds to an epoxy or ether radical derived from the general formula VII

$$D-Si(R^7)_u(OR^6)_{3-u} \quad (VII)$$

where u=0 or 1, D corresponding to a 3-glycidyloxyalkyl, 3-glycidyloxypropyl, epoxyalkyl, epoxycycloalkyl or polyalkylglycolalkyl radical or to a polyalkylglycol-3-propyl radical, $R^7$ corresponding to a linear, branched and/or cyclic alkyl radical having 1 to 4 C atoms and $R^6$ corresponding to a linear and/or branched alkyl radical having 1 to 4 C atoms. The polyalkylglycol radical is expediently selected from the group consisting of polyethylene glycol-3-propyl (PEG-propyl), polypropylene glycol-3-propyl, polymethylene glycol-3-propyl or from copolymers having propylene glycol and ethylene glycol groups, for example with a random distribution or block polymers, the polyalkylene glycol groups preferably having an average degree of distribution of from about 3 to 14 alkylene glycol groups per molecule.

E in a structural element, for example as structural element $[Si(E)(R^8)_v(OR^9)_{1-v}O]_wR^9$, of the composition according to the invention, in particular in the general formula I, corresponds to an organofunctional radical derived from the general formula VIII

$$E-Si(R^8)_v(OR^9)_{3-v} \quad (VIII)$$

where v=0 or 1, $R^8$ corresponding to a linear, branched or cyclic alkyl radical having 1 to 4 C atoms, E corresponding to a radical $R^{8*}-Y_m-(CH_2)_s-$ and $R^{8*}$ corresponding to a mono-, oligo- or perfluorinated alkyl radical having 1 to 9 C atoms or to a mono-, oligo- or perfluorinated aryl radical, furthermore Y corresponding to a $CH_2$, O, aryl or S radical and m being 0 or 1 and s being 0 or 2 and/or E corresponding to a vinyl, allyl or isopropenyl radical, mercaptoalkyl radical, sulfanealkyl radical, ureidoalkyl radical, to an acryloyloxyalkyl radical or to a linear, branched or cyclic alkoxy radical having 1 to 4 C atoms and $R^9$ corresponding to a linear, branched and/or cyclic alkyl radical having 1 to 4 C atoms. According to a preferred embodiment, E corresponds to an $F_3C(CF_2)_r(CH_2)_s$ group, r being an integer from 0 to 9, s being 0 or 2, particularly preferably r being 5 and s being 2, $CF_3(CF_2)_5(CH_2)_2$ group or a $CF_3(C_6H_4)$ or a $C_6F_5$ group. According to an expedient embodiment, E corresponds to a sulfanealkyl radical of the general formula IX with $-(CH_2)_q-X-(CH_2)_q-Si(R^8)_v(OR^9)_{3-v}$ (IX), where q=1, 2 or 3, $X=S_p$, p corresponding on average to 2 or 2.18 or on average to 4 or 3.8 with a distribution of from 2 to 12 sulfur atoms in the chain, and v, $R^8$ and $R^9$ being as defined above. The resulting silanes in which E corresponds to the general formula IX may be, for example, bis(triethoxysilylpropyl)disulfane (Si 266), bis(trimethoxysilylpropyl)disulfane, bis(triethoxysilylpropyl)tetrasulfane (Si 69), bis(trimethoxysilylpropyl)tetrasulfane, bis(triethoxysilylmethyl)disulfane, bis(trimethoxysilylmethyl)disulfane, bis(triethoxysilylpropyl)disulfane, bis(diethoxymethylsilylpropyl)disulfane, bis(dimethoxymethylsilylpropyl)disulfane, bis(dimethoxymethylsilylmethyl)disulfane, bis(diethoxymethylsilylmethyl)disulfane, bis(diethoxymethylsilylpropyl)tetrasulfane, bis(dimethoxymethylsilylpropyl)tetrasulfane, bis(dimethoxymethylsilylmethyl)tetrasulfane and/or bis(diethoxymethylsilylmethyl)tetrasulfane. According to a further expedient embodiment, E corresponds to a methoxy, ethoxy, isopropoxy or n-propoxy radical, where v is 0, so that the compound of the general formula VIII corresponds to a tetraalkoxysilane. Customary tetraalkoxysilanes are tetramethoxysilane or tetraethoxysilane.

Particularly preferred compounds of the general formula VIII are: tridecafluoro-1,1,2,2-tetrahydrooctyl-1-trimethoxysilane, tridecafluoro-1,1,2,2-tetrahydrooctyl-1-triethoxysilane or corresponding mixtures containing silanes derived therefrom or 3,3,3-trifluoropropyltrimethoxysilane, 3,3,3-trifluoropropylmethyldimethoxysilane, 3,3,3-trifluoropropylmethyldimethoxysilane, 3,3,3-trifluoropropylcyclohexyldimethoxysilane, 3,3,3-trifluoropropylphenyldiethoxysilane, 3,3,3-trifluoropropyltriethoxysilane, 3,3,3,2,2-pentafluoropropylmethyldimethoxysilane, 3,3,3-trifluoropropyloxyethyltrimethoxysilane, 3,3,3-trifluoropropylmercaptoethyltrimethoxysilane, 3,3,3-trifluoropropyloxyethylmethyldimethoxysilane and in particular tridecafluoro-1,1,2,2-tetrahydrooctyltrimethoxysilane and tridecafluoro-1,1,2,2-tetrahydrooctyltriethoxysilane and acryloxypropyltrialkoxysilane, methacryloxypropyltrialkoxysilane, it being possible for the alkoxy radical to be replaced by methoxy, ethoxy or propoxy radicals. Suitable compounds are likewise methacryloxymethyltriethoxysilane, methacryloxymethyltrimethoxysilane, methacryloxypropylmethyldiethoxysilane, methacryloxypropylmethyldimethoxysilane, methacryloxypropylmethyldiethoxysilane, methacryloxymethylmethyldiethoxysilane and/or methacryloxymethylmethyldimethoxysilane.

The compositions according to the invention have a pH in the range from 1.0 and 5.4, in particular in the range from 3.0 to 5.4, preferably from 3.5 to 5.4, particularly preferably from 3.5 to 4.8. Based on the alkoxysilanes originally used for the preparation of the composition, they may have a content of from 5 to 35% by weight of silicon compounds, in particular from 7.5 to 40% by weight, preferably from 10 to 40% by weight, particularly preferably from 12.5 to 30% by weight. An advantage of the compositions is that they remain stable even in the case of a content of from 12.5 to 30% by weight of silicon compounds at a pH of from 2.0 to 5.4, in particular at from 3.5 to 5.4, preferably at from 3.5 to 4.8, particularly preferably at from 4.2 to 4.8.

A composition is regarded as being stable if it forms no gel over a period of at least 2 months, preferably 6 months, at room temperature in a closed container, particularly preferably over 10 months at room temperature (from 20 to 25° C.). Particularly stable compositions are stable over 12 months under said conditions. Alternatively, particularly stable compositions may have a stability of up to 2 months, in particular of 6 months, under stress conditions. Stress condition is understood to mean storage in a closed container at 60° C.

The pH of the composition is adjusted as a rule during its preparation, so that subsequent adjustment of the pH can be omitted. Formic acid, acetic acid, an acidic silica gel, an acidic silica sol, glacial acetic acid, nitric acid, sulfuric acid and/or phosphoric acid are preferably used as acids for adjusting the pH, in particular as HX, where X is an inorganic or organic acid radical. Suitable silica sols are in particular Levasil 100S as an acidic silica sol, but also precipitated silica or dispersed silica.

Nanoscale fillers or generally customary fillers can be added as auxiliaries and as a further component to the composition. These may also be neutral or basic silica sols or silica gels. Additives such as flow improvers or, for example, catalysts for modifying the curing rate can also be added to the composition. Substantially solvent-free compositions likewise according to the invention comprise substantially completely hydrolyzed and substantially water-soluble, bis-aminofunctional silicon compounds, at least one structure corresponding to the general formula (I) represented in idealized form, where $b \geq 0$, $a \geq 1$, $c \geq 1$, $d \geq 0$ and/or $w \geq 0$ and $e \geq 1$, and the pH being <12, in particular it being possible for b to be 0.

The compositions may preferably only consist of water, acid and the silicon compounds derived from the substantially water-soluble alkoxysilanes of the general formulae II, IV, VI, VII and/or VIII, and/or the substantially completely hydrolyzed, water-soluble cocondensates thereof, at least one structure corresponding to the general formula (I) represented in idealized form, and are substantially free of organic solvents. Thus, compositions according to the invention can advantageously have an active substance content of from 5 to 40% by weight, preferably from 7.5 to 35% by weight, in particular from 12.5 to 30% by weight, of said silicon compounds. Preferably, the pH of these compositions is from 2.0 to 5.4. Further additives for stabilizing the composition are as a rule not necessary. Further substantially solvent-free compositions according to the invention consist of substantially completely hydrolyzed and substantially water-soluble bis-aminofunctional silicon compounds, at least one structure corresponding to the general formula (I) represented in idealized form, where $b=0$, $a \geq 1$, $c=0$, $d=0$, $w=0$ and $e \geq 1$, and in particular the content of bisaminoalkylalkoxysilane being present in the composition according to the above definition to an extent of at least 12.5, in particular from 12.5 to 35% by weight, preferably from 15 to 35% by weight, particularly preferably from 15 to 25% by weight, the pH preferably being from 1.0 to 5.4, in particular from 3.5 to 5.4, preferably from 3.5 to 4.8, particularly preferably from 4.2 to 4.8, during the preparation process and/or in the composition. Even these compositions have a shelf-life in closed containers of at least 6 months at room temperature, preferably 12 months at room temperature, in particular up to 5 months at 60° C. According to an expedient embodiment, the content of bisaminoalkylalkoxysilane in these compositions may also be in the range from 1 to 12.5% by weight, in particular from 5 to 12.5% by weight, the pH preferably being from 1.0 to 5.4, in particular from 3.5 to 5.4, preferably from 3.5 to 4.8, particularly preferably from 4.2 to 4.8, during the preparation process and/or in the composition.

According to a further embodiment, the substantially solvent-free composition consists of substantially completely hydrolyzed and substantially water-soluble bis-aminofunctional silicon compounds, at least one structure corresponding to the general formula (I) represented in idealized form, where $b \geq 1$, $a \geq 1$, $c=0$, $d=0$, $w=0$ and $e \geq 1$, and the molar ratio of the bis-aminofunctional alkoxysilane to the aminofunctional alkoxysilane being $\geq 1.0$ and the pH being from 1.0 to 5.4, in particular from 3.5 to 5.4, preferably from 3.5 to 4.8. These compositions are particularly stable at a ratio of the bis-aminofunctional alkoxysilane to the aminofunctional alkoxysilane of $\geq 1.2$, in particular of 2, if the pH is from 3.5 to 5.4, preferably from 3.5 to 4.8. In the case of these compositions, a shelf-life of at least 6, in particular up to 8, months at 60° C. in a closed container can be achieved. Alternative substantially solvent-free compositions comprise substantially water-soluble bis-aminofunctional silicon compounds, in particular with the proviso that at least one structure corresponds to the general formula (I) represented in idealized form, where $b \geq 1$, $a \geq 1$, $c \geq 0$, $d \geq 0$, $w \geq 1$ and $e \geq 1$, the pH preferably being from 1.0 to 5.4, in particular from 3.0 to 5.4, especially from 3.5 to 5.4, particularly preferably from 3.5 to 4.5. Preferably with a content of from 5 to 20% by weight in relation to the alkoxysilane compounds used, it being possible here for the content of the fluoro-functional alkoxysilane to be from 1 to 18% by weight, preferably from 2 to 15% by weight, particularly preferably from 3 to 10% by weight.

In addition, compositions according to the invention can advantageously and virtually be diluted as desired with water or—if desired—with a water-soluble solvent, but not, for example, exclusively with methanol, ethanol or isopropanol. The active substance content, i.e. the content of abovementioned silicon compounds, in a composition according to the invention can be adjusted virtually continuously by dilution with water and/or an aqueous solvent to a content of from 0.0001 to 40% by weight.

The invention also relates to a process for the preparation of a composition containing substantially water-soluble, bis-aminofunctional silicon compounds substantially free of alkoxy groups, and water and an acid, in which the water, an acid, optionally alcohol and/or optionally a catalyst are initially introduced and at least one bisaminosilane of the formula II

$$(OR^1)_3Si\text{-}A\text{-}Si(OR^1)_3 \qquad (II)$$

where A is a bis-aminofunctional group of the formula III

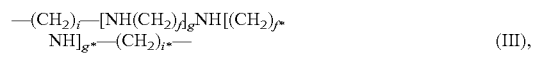

$$-(CH_2)_{f^-}[NH(CH_2)_i]_gNH[(CH_2)_{f^*}NH]_{g^*}-(CH_2)_{i^*}- \qquad (III),$$

in which i, i*, f, f*, g or g* are identical or different, with i and/or i*=from 0 to 8, f and/or f*=1, 2 or 3, g and/or g*=0, 1 or 2 and $R^1$ corresponds to a linear, branched and/or cyclic alkyl radical having 1 to 4 C atoms, i and/or i* corresponding in particular to one of the numbers 1, 2, 3 or 4, preferably 3, the compound bis(triethoxysilylpropyl)amine $((H_5C_2O)_3Si(CH_2)_3NH(CH_2)_3Si(OC_2H_5)_3$, bis-AMEO) where i, i*=3 and g, g*=0 being particularly preferred, and/or the condensates thereof, and optionally at least one aminoalkylalkoxysilane of the formula IV

$$B\text{—}Si(R^3)_x(OR^2)_{3-x} \qquad (IV)$$

where $x=0$ or 1, $R^2$ corresponding to a linear, branched and/or cyclic alkyl radical having 1 to 4 C atoms and B corresponding to one of the following aminofunctional groups of the general formula Va or Vb

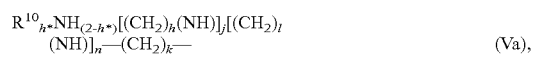

$$R^{10}{}_{h^*}NH_{(2-h^*)}[(CH_2)_h(NH)]_j[(CH_2)_l(NH)]_n-(CH_2)_k- \qquad (Va),$$

in which $0 \leq h \leq 6$; $h^*=0$, 1 or 2, $j=0$, 1 or 2; $0 \leq l \leq 6$; $n=0$, 1 or 2; $0 \leq k \leq 6$ and $R^{10}$ corresponds to a benzyl, aryl, vinyl or formyl radical and/or to a linear, branched and/or cyclic alkyl radical having 1 to 8 C atoms, and/or

$$[NH_2(CH_2)_m]_2N(CH_2)_p- \qquad (Vb),$$

in which 0≦m≦6 and 0≦p≦6, and/or the condensates thereof, and optionally at least one alkylalkoxysilane of the general formula VI

where y=0 or 1, C corresponding to a linear, branched or cyclic alkyl radical having 1 to 20 C atoms, $R^5$ corresponding to a linear, branched and/or cyclic alkyl radical having 1 to 12 C atoms and/or aryl radical, $R^4$ corresponding to a linear, branched and/or cyclic alkyl radical having 1 to 4 C atoms, and/or the condensates thereof, and optionally at least one epoxy- or ether-alkoxysilane of the general formula VII

where u=0 or 1, D corresponding to a 3-glycidyloxyalkyl, 3-glycidyloxypropyl, epoxyalkyl, epoxycycloalkyl or polyalkylglycolalkyl radical or to a polyalkylglycol-3-propyl radical, $R^7$ corresponding to a linear, branched or cyclic alkyl radical having 1 to 4 C atoms and $R^6$ corresponding to a linear, branched and/or cyclic alkyl radical having 1 to 4 C atoms, and/or the condensates thereof, and optionally at least one organofunctional alkoxysilane of the formula VIII

where v=0 or 1, $R^8$ corresponding to a linear, branched or cyclic alkyl radical having 1 to 4 C atoms, E corresponding to a radical $R^{8*}-Y_m-(CH_2)_s-$, $R^{8*}$ corresponding to a mono-, oligo- or perfluorinated alkyl radical having 1 to 9 C atoms or to a mono-, oligo- or perfluorinated aryl radical, furthermore Y corresponding to a $CH_2$, O, aryl or S radical and m being 0 or 1 and s being 0 or 2, or to a vinyl, allyl or isopropenyl radical, mercaptoalkyl radical, sulfanealkyl radical, ureidoalkyl radical, to an acryloyloxyalkyl radical or to a linear, branched or cyclic alkoxy radical having 1 to 4 C atoms and $R^9$ corresponding to a linear, branched and/or cyclic alkyl radical having 1 to 4 C atoms, and/or the condensates thereof, the sulfanealkyl radical corresponding to the general formula IX with $-(CH_2)_q-X-(CH_2)_q-Si(R^8)_v(OR^9)_{3-v}$ (IX), where q=1, 2 or 3, $X=S_p$, p corresponding on average to 2 or 2.18 or on average to 4 or 3.8 with a distribution of from 2 to 12 sulfur atoms in the chain, and v, $R^8$ and $R^9$ being as defined above, are hydrolyzed and the alcohol is substantially removed.

According to the invention, substantially unhydrolyzed bis-aminofunctional alkylalkoxysilane of the formula II are used, unhydrolyzed meaning that >80% by weight, particularly >95% by weight, in particular 98% by weight, of the bis-aminofunctional silane compound are added in still unhydrolyzed form to the reaction mixture. According to a further alternative according to the invention, only at least one bis-aminofunctional alkylalkoxysilane of the formula II and at least one alkylalkoxysilane of the general formula VI are used in the process. Particularly preferred compounds are bis-AMEO, propyltrialkoxysilane (PTMO, PTEO), methyltriethoxysilane, methyltriethoxysilane. These alkoxysilanes, too, are preferably used in unhydrolyzed form, according to the above definition, in the process.

The adjustment of the pH of the composition is effected as a rule during its preparation, so that subsequent adjustment of the pH can be omitted. Formic acid, acetic acid, an acidic silica gel or an acidic silica sol, glacial acetic acid, nitric acid, sulfuric acid and/or phosphoric acid are preferably used as acids for adjusting the pH, in particular as HX, X being an inorganic or organic acid radical. Suitable silica sols are in particular Levasil 100S as an acidic silica sol, but also precipitated silica or dispersed silica. For example, zirconium n-propylate or another customary catalyst can be used as the catalyst.

As a rule, water and an acid are initially introduced and the silanes of the general formulae II, IV, VI, VII and/or VIII and/or products derived therefrom, such as protonated silanes, hydrolysis products, cocondensates and/or condensates, are added in succession and/or as a mixture, hydrolyzed and optionally condensed, in particular at a pH of from 2.0 to 5.4, preferably at a pH of from 3.0 to 5.4. By further addition of acid, the pH can be maintained or adjusted during the process. The silanes of the general formulae II, IV, VI, VII and/or VIII, the hydrolysis products, cocondensates or condensates thereof and/or mixtures thereof can be added in aqueous and/or alcoholic solution. This can be effected in succession or as a mixture. In carrying out a process in an aqueous/alcoholic solution, by addition of alcohol or of an alcoholic silane solution, the hydrolysis can be carried out at a pH below 12, i.e. also in the alkaline range. Thereafter, the hydrolysis alcohol and any additionally added alcohol are substantially completely removed from the reaction mixture. The pH adjustment can be effected before or after the removal of the alcohol.

The addition of an alcoholic solution to the initially introduced, acidified water can be effected in particular in the following manner. First, an alcohol, for example ethanol, is mixed with a silane of the formulae II, IV, VI, VII and/or VIII, optionally with a little water and optionally a catalyst or optionally an acid, and, after a short reaction, added to the acidified, initially introduced water. If the pH is not in the desired range, it can be modified by addition of further acid. Likewise, further water can also be added after addition of at least one silane to the reaction mixture.

Depending on the desired properties of the composition, it may be expedient to add inorganic fillers, such as $TiO_2$, $SiO_2$, silica sols, Aerosil dispersions and/or $Al_2O_3$, in the process itself.

For complete removal of the hydrolysis alcohol or of the added alcohol, water can constantly be added to the composition and is distilled off azeotropically with the alcohol until the composition is substantially alcohol-free.

Alternatively, an aqueous silane of the general formula II and/or the cocondensate or condensate thereof, for example a cocondensate of the formula II with VI, can be initially introduced and can be hydrolyzed at a low pH, for example at from 1.0 to 3.5, and the silanes of the general formulae IV, VII and/or VIII and/or the condensates thereof are added individually or as a mixture; preferably, at least one silane of the formula VI is added. By addition of further aminosilane of the formulae II and/or IV, the pH can be increased. After addition of the last silane, the reaction mixture can be substantially completely hydrolyzed with stirring also at a temperature of from 30 to 100° C. The hydrolysis is preferably effected at from 55 to 80° C. in all processes.

The invention therefore also relates to a process for the preparation of a composition containing substantially water-soluble, bis-aminofunctional silicon compounds substantially free of alkoxy groups, and water and an acid, as well as a composition obtainable by this process, an aqueous solution of at least one water-soluble silane of the general formulae II, IV and/or VII or the water-soluble condensates thereof, in particular cocondensates of silanes of the formulae II, IV and/or VII with one another or with VI and/or VIII, for example also with silica sols, or the water-soluble hydrolysis products of a silane of the general formula VI, in particular the methyl-functionalized one, being initially introduced, the silane of the formula II corresponding to a bisaminoalkoxysilane $$(OR^1)_3Si-A-Si(OR^1)_3 \qquad (II)$$

where A is a bis-aminofunctional group of the formula III

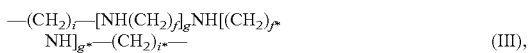
(III), in which i, i*, f, f*, g or g* are identical or different, with i and/or i*=from 0 to 8, f and/or f*=1, 2 or 3, g and/or g*=0, 1 or 2 and $R^1$ corresponds to a linear, cyclic and/or branched alkyl radical having 1 to 4 C atoms, and/or the condensates thereof, in particular at least partly protonated, the silane of the formula IV corresponding to an aminoalkylalkoxysilane $$B\text{—}Si(R^3)_x(OR^2)_{3-x} \quad (IV)$$

where x=0 or 1, $R^2$ corresponding to a linear, branched and/or cyclic alkyl radical having 1 to 4 C atoms and B corresponding to one of the following aminofunctional groups of the general formula Va or Vb

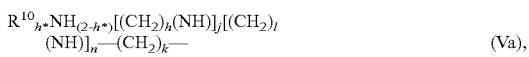
(Va), in which 0≦h≦6; h*=0, 1 or 2, j=0, 1 or 2; 0≦l≦6; n=0, 1 or 2; 0≦k≦6 and $R^{10}$ corresponds to a benzyl, aryl, vinyl or formyl radical and/or to a linear, branched and/or cyclic alkyl radical having 1 to 8 C atoms, and/or $$[NH_2(CH_2)_m]_2N(CH_2)_p\text{—} \quad (Vb),$$

in which 0≦m≦6 and 0≦p≦6, and/or the condensates thereof, in particular at least partly protonated, the silane of the formula VII corresponding to an epoxy- or ether-alkoxysilane $$D\text{-}Si(R^7)_u(OR^6)_{3-u} \quad (VII)$$

where u=0 or 1, D corresponding to a 3-glycidyloxyalkyl, 3-glycidyloxypropyl, epoxyalkyl, epoxycycloalkyl or polyalkylglycolalkyl radical or to a polyalkylglycol-3-propyl radical, $R^7$ corresponding to a linear, branched or cyclic alkyl radical having 1 to 4 C atoms and $R^6$ corresponding to a linear, branched and/or cyclic alkyl radical having 1 to 4 C atoms, and/or the condensates thereof, the silane of the formula VI corresponding to an alkylalkoxysilane $$C\text{—}Si(R^5)_y(OR^4)_{3-y} \quad (VI)$$

where y=0 or 1, C corresponding to a linear, branched or cyclic alkyl radical having 1 to 4 C atoms, $R^5$ corresponding to a linear, branched or cyclic alkyl radical having 1 to 4 C atoms and/or aryl radical, $R^4$ corresponding to a linear, branched and/or cyclic alkyl radical having 1 to 4 C atoms, and optionally acid, optionally alcohol and optionally a catalyst and optionally one or more further silanes of the general formulae II, IV, VI, VII and/or VIII or the condensates thereof being added, the added silane of the formula VI corresponding to an alkylalkoxysilane $$C\text{—}Si(R^5)_y(OR^4)_{3-y} \quad (VI)$$

where y=0 or 1, C corresponding to a linear, branched or cyclic alkyl radical having 1 to 20 C atoms, $R^5$ corresponding to a linear, branched or cyclic alkyl radical having 1 to 12 C atoms and/or aryl radical, $R^4$ corresponding to a linear, branched and/or cyclic alkyl radical having 1 to 4 C atoms, the silane of the formula VIII corresponding to an organofunctional alkoxysilane $$E\text{-}Si(R^8)_v(OR^9)_{3-v} \quad (VIII)$$

where v=0 or 1, $R^8$ corresponding to a linear, branched or cyclic alkyl radical having 1 to 4 C atoms, E corresponding to a radical $R^{8*}\text{—}Y_m\text{—}(CH_2)_s\text{—}$, $R^{8*}$ corresponding to a mono-, oligo- or perfluorinated alkyl radical having 1 to 9 C atoms or to a mono-, oligo- or perfluorinated aryl radical, furthermore Y corresponding to a $CH_2$, O, aryl or S radical and m being 0 or 1 and s being 0 or 2, or to a vinyl, allyl or isopropenyl radical, mercaptoalkyl radical, sulfanealkyl radical, ureidoalkyl radical, to an acryloyloxyalkyl radical or to a linear, branched or cyclic alkoxy radical having 1 to 4 C atoms and $R^9$ corresponding to a linear, branched and/or cyclic alkyl radical having 1 to 4 C atoms, and/or the condensates thereof, and being hydrolyzed and the alcohol being substantially removed.

Depending on the desired properties of the composition, it may be expedient to add inorganic fillers such as $TiO_2$, $SiO_2$, silica sols, Aerosil dispersions and/or $Al_2O_3$, in the process itself.

The alcohol already present and/or formed during the reaction is removed from the reaction mixture in all process variants according to the invention. The distillative separation of the alcohol is preferably carried out under reduced pressure. The distillative removal of the alcohol is preferably carried out until a temperature which corresponds to the boiling point of water is reached in the top of the column. If the alcohol could not be substantially completely removed, further water is added and an alcohol/water mixture is further removed, in particular removed by distillation. This procedure is repeated until the alcohol has been substantially removed. The alcohol is considered to have been substantially removed if its content is below 4% by weight, in particular below 2% by weight, preferably below 1, particularly preferably below 0.5% by weight, below 0.1% by weight or below 0.05% by weight. The resulting composition is substantially alcohol-free, i.e. optionally added alcohol as well as the hydrolysis alcohol are preferably completely removed from the reaction system after the approximately complete hydrolysis. The compositions used are therefore substantially free of free alcohols and/or alkoxy radicals if the content is less than 4% by weight, in particular below 2% by weight, preferably below 1, particularly preferably below 0.5% by weight, below 0.1% by weight or below 0.05% by weight.

In contrast to processes of the prior art, the substituted alkoxysilanes are hydrolyzed in the abovementioned processes at a water content of from 50 to 90% by weight, in particular at from 65 to 90% by weight, of water. The water content is based on the amount of initially introduced water or total water content in the total reaction mixture before alcohol and/or water are removed from the mixture. During the reaction, the pH should be from 2.0 to 5.4, in particular from 3.0 to 5.4, preferably from 3.5 to 5.4. Even after the removal of the alcohol from the reaction mixture, the pH of the composition may be from 1.0 to 5.4, in particular from 3.0 to 5.4, preferably from 3.5 to 5.4. The alkoxysilanes and/or tetraalkoxysilanes which are used and which are substituted by bisamino, amino, alkyl, epoxy, polyalkylglycolalkyl, 3-glycidyloxyalkyl, glycidyloxyalkyl, fluoroalkyl, mercapto, ureidoalkyl, alkenyl or acryloyloxyalkyl radicals are present altogether with a content of from 7.5 to 50% by weight, in particular with from 10 to 40% by weight, preferably with from 10 to 35% by weight, particularly preferably with from 20 to 35% by weight, after removal of the alcohol, based on the alkoxysilanes used in the composition.

Compositions prepared by the process according to the invention are stable and clear or in some cases also opalescent to turbid solutions, substantially free of organic solvents, can be diluted with water in any ratio, develop substantially no hydrolysis alcohols on addition of water, and have a flashpoint of more than 63° C., preferably of more than 80° C., particularly preferably of more than 93° C.

The invention furthermore relates to an aqueous composition or an aqueous silane system containing substantially water-soluble, bis-aminofunctional silicon compounds substantially free of alkoxy groups, and water and an acid, obtainable by initially introducing water, an acid and optionally alcohol and reacting at least one bis-aminofunctional alkoxysilane of the formula II where A is a bis-aminofunctional group of the formula III $$(OR^1)_3Si\text{-}A\text{-}Si(OR^1)_3 \qquad (II);$$

$$-(CH_2)_i-[NH(CH_2)_f]_g NH[(CH_2)_{f^*} NH]_{g^*}-(CH_2)_{i^*}- \qquad (III),$$

in which i, i*, f, f*, g or g* are identical or different, with i and/or i*=from 0 to 8, f and/or f*=1, 2 or 3, g and/or g*=0, 1 or 2 and $R^1$ corresponds to a linear, branched and/or cyclic alkyl radical having 1 to 4 C atoms, and/or the condensates thereof, and optionally at least one aminoalkylalkoxysilane of the formula IV where x=0 or 1, $R^2$ corresponding to a linear, branched and/or cyclic alkyl radical having 1 to 4 C atoms and B corresponding to one of the following aminofunctional groups of the general formula Va or Vb $$B-Si(R^3)_x(OR^2)_{3-x} \qquad (IV);$$

$$R^{10}{}_{h^*}NH_{(2-h^*)}[(CH_2)_h(NH)]_j[(CH_2)_l(NH)]_n-(CH_2)_k- \qquad (Va),$$

in which 0≦h≦6; h*=0, 1 or 2, j=0, 1 or 2; 0≦l≦6; n=0, 1 or 2; 0≦k≦6 and $R^{10}$ corresponds to a benzyl, aryl, vinyl or formyl radical and/or to a linear, branched and/or cyclic alkyl radical having 1 to 8 C atoms, and/or $$[NH_2(CH_2)_m]_2N(CH_2)_p- \qquad (Vb),$$

in which 0≦m≦6 and 0≦p≦6, and/or the condensates thereof, and optionally with at least one alkylalkoxysilane of the general formula VI $$C-Si(R^5)_y(OR^4)_{3-y} \qquad (VI)$$

where y=0 or 1, C corresponding to a linear, branched or cyclic alkyl radical having 1 to 20 C atoms, $R^5$ corresponding to a linear, branched or cyclic alkyl radical having 1 to 12 C atoms and/or aryl radical, $R^4$ corresponding to a linear, branched and/or cyclic alkyl radical having 1 to 4 C atoms, and/or the condensates thereof, and optionally with at least one epoxy- or ether-alkoxysilane of the general formula VII $$D-Si(R^7)_u(OR^6)_{3-u} \qquad (VII)$$

where u=0 or 1, D corresponding to a 3-glycidyloxyalkyl, 3-glycidyloxypropyl, epoxyalkyl, epoxycycloalkyl or polyalkylglycolalkyl radical or to a polyalkylglycol-3-propyl radical, $R^7$ corresponding to a linear, branched or cyclic alkyl radical having 1 to 4 C atoms and $R^6$ corresponding to a linear, branched and/or cyclic alkyl radical having 1 to 4 C atoms, and/or the condensates thereof, and optionally with at least one organofunctional alkoxysilane of the formula VIII $$E-Si(R^8)_v(OR^9)_{3-v} \qquad (VIII)$$

where v=0 or 1, $R^8$ corresponding to a linear, branched or cyclic alkyl radical having 1 to 4 C atoms, E corresponding to a radical $R^{8*}-Y_m-(CH_2)_s-$, $R^{8*}$ corresponding to a mono-, oligo- or perfluorinated alkyl radical having 1 to 9 C atoms or to a mono-, oligo- or perfluorinated aryl radical, furthermore Y corresponding to a $CH_2$, O, aryl or S radical and m being 0 or 1 and s being 0 or 2, or to a vinyl, allyl or isopropenyl radical, mercaptoalkyl radical, sulfanealkyl radical, ureidoalkyl radical, to an acryloyloxyalkyl radical or to a linear, branched or cyclic alkoxy radical having 1 to 4 C atoms and $R^9$ corresponding to a linear, branched and/or cyclic alkyl radical having 1 to 4 C atoms, and/or the condensates thereof, the sulfanealkyl radical corresponding to the general formula IX with $-(CH_2)_q-X-(CH_2)_q-Si(R^8)_v(OR^9)_{3-v}$ (IX), where q=1, 2 or 3, X=$S_p$, p corresponding on average to 2 or 2.18 or on average to 4 or 3.8 with a distribution of from 2 to 12 sulfur atoms in the chain, and v, $R^8$ and $R^9$ being as defined above, hydrolyzing, in particular completely hydrolyzing, and substantially completely removing the alcohol.

As mentioned, preferably substantially unhydrolyzed bis-aminofunctional alkylalkoxysilane of the formula II or unhydrolyzed alkoxysilanes of the formulae IV, VI, VII and/or VIII are used. The resulting composition is substantially alcohol-free.

The invention furthermore relates to a process for the preparation of a composition containing substantially water-soluble, bis-aminofunctional silicon compounds substantially free of alkoxy groups, and water and an acid, an organic solvent, optionally water, optionally an acid and/or optionally a catalyst being initially introduced and
at least one bisaminoalkoxysilane of the formula II $$(OR^1)_3Si\text{-}A\text{-}Si(OR^1)_3 \qquad (II)$$

where A is a bis-aminofunctional group of the formula III $$-(CH_2)_i-[NH(CH_2)_f]_g NH[(CH_2)_{f^*} NH]_{g^*}-(CH_2)_{i^*}- \qquad (III),$$

in which i, i*, f, f*, g or g* are identical or different, with i and/or i*=from 0 to 8, f and/or f*=1, 2 or 3, g and/or g*=0, 1 or 2 and $R^1$ corresponds to a linear, cyclic and/or branched alkyl radical having 1 to 4 C atoms, and/or the condensates thereof, and optionally
at least one aminoalkylalkoxysilane of the formula IV $$B-Si(R^3)_x(OR^2)_{3-x} \qquad (IV)$$

where x=0 or 1, $R^2$ corresponding to a linear, branched and/or cyclic alkyl radical having 1 to 4 C atoms and B corresponding to one of the following aminofunctional groups of the general formula Va or Vb $$R^{10}{}_{h^*}NH_{(2-h^*)}[(CH_2)_h(NH)]_j[(CH_2)_l(NH)]_n-(CH_2)_k- \qquad (Va),$$

in which 0≦h≦6; h*=0, 1 or 2, j=0, 1 or 2; 0≦l≦6; n=0, 1 or 2; 0≦k≦6 and $R^{10}$ corresponds to a benzyl, aryl, vinyl or formyl radical and/or to a linear, branched and/or cyclic alkyl radical having 1 to 8 C atoms, and/or $$[NH_2(CH_2)_m]_2N(CH_2)_p- \qquad (Vb),$$

in which 0≦m≦6 and 0≦p≦6, and/or the condensates thereof, and optionally
at least one alkylalkoxysilane of the general formula VI $$C-Si(R^5)_y(OR^4)_{3-y} \qquad (VI)$$

where y=0 or 1, C corresponding to a linear, branched or cyclic alkyl radical having 1 to 20 C atoms, $R^5$ corresponding to a linear, branched or cyclic alkyl radical having 1 to 12 C atoms and/or aryl radical, $R^4$ corresponding to a linear, branched and/or cyclic alkyl radical having 1 to 4 C atoms, and/or the condensates thereof, and optionally
at least one epoxy- or ether-alkoxysilane of the general formula VII $$D-Si(R^7)_u(OR^6)_{3-u} \qquad (VII)$$

where u=0 or 1, D corresponding to a 3-glycidyloxyalkyl, 3-glycidyloxypropyl, epoxyalkyl, epoxycycloalkyl or polyalkylglycolalkyl radical or to a polyalkylglycol-3-propyl radical, $R^7$ corresponding to a linear, branched or cyclic alkyl radical having 1 to 4 C atoms and $R^6$ corresponding to a linear, branched and/or cyclic alkyl radical having 1 to 4 C atoms, and/or the condensates thereof, and optionally at least one organofunctional alkoxysilane of the formula VIII

where v=0 or 1, $R^8$ corresponding to a linear, branched or cyclic alkyl radical having 1 to 4 C atoms, E corresponding to a radical $R^{8*}-Y_m-(CH_2)_s-$, $R^{8*}$ corresponding to a mono-, oligo- or perfluorinated alkyl radical having 1 to 9 C atoms or to a mono-, oligo- or perfluorinated aryl radical, furthermore Y corresponding to a $CH_2$, O, aryl or S radical and m being 0 or 1 and s being 0 or 2, or to a vinyl, allyl or isopropenyl radical, mercaptoalkyl radical, sulfanealkyl radical, ureidoalkyl radical, to an acryloyloxyalkyl radical or to a linear, branched or cyclic alkoxy radical having 1 to 4 C atoms and $R^9$ corresponding to a linear, branched and/or cyclic alkyl radical having 1 to 4 C atoms, and/or the condensates thereof, being hydrolyzed, in particular being completely hydrolyzed, and the hydrolysis alcohol and the solvent being substantially removed.

A suitable solvent is in particular an alcohol selected from the group consisting of methanol, ethanol, propanol and/or a mixture of these. Expedient solvents may, however, also be ethyl acetate, THF, ketones or hydrocarbons.

According to the invention, an alcohol is initially introduced together with at least one of the silanes of the general formulae II, IV, VI, VII and/or VIII, the condensates thereof and/or mixtures of these. Thereafter, water and/or acid may be added. If only water is added, the hydrolysis can take place in the alkaline range.

The process is preferably carried out in such a way that an alcohol and optionally water are initially introduced and at least one bisaminoalkoxysilane of the general formula II and/or the condensate thereof are added and hydrolyzed and optionally condensed. The reaction mixture becomes alkaline as a result of the addition of the bisaminoalkoxysilane of the general formula I. Preferably, a substantially unhydrolyzed bisaminoalkylalkoxysilane of the formula II is used. According to the invention, at least one bisaminoalkylalkoxysilane of the formula II and one alkylalkoxysilane of the general formula VI are used.

If alcohol and optionally water and optionally an acid are initially introduced, a bisaminoalkoxysilane of the general formula II and/or the condensate thereof are added and hydrolyzed and optionally condensed. Preferably, at least one alkylalkoxysilane of the formula VI and optionally at least one aminoalkylalkoxysilane of the formula IV, optionally at least one epoxy- or ether-alkoxysilane of the general formula VII and optionally at least one organofunctional alkoxysilane of the formula VIII and/or the condensates thereof are then added in succession or as a mixture. The hydrolysis takes place in this case in the alkaline range, and the pH is preferably below 12.

The addition of the silanes of the general formula II, IV, VI, VII or VIII and/or products derived therefrom, such as hydrolysis products and/or condensates, such as cocondensates, can be effected in succession or as a mixture. Likewise, the addition of the silanes of the general formulae II, IV, VI, VII and/or VIII and/or the condensates thereof can be effected in aqueous and/or alcoholic solution. If required, at least one inorganic filler, such as titanium dioxide, silica, silica sols, an Aerosil dispersion or aluminum oxide, can be added during the process.

If no acid is added before or during the hydrolysis, the pH may become alkaline, in particular it may be below 12. The reaction can be carried out at from 30 to 100° C., preferably from 55 to 80° C. After the hydrolysis and optionally effected condensation, the pH can be adjusted to a value of from 1.0 to 7.0. This is effected by addition of an acid.

Formic acid, acetic acid, an acidic silica gel, an acidic silica sol, glacial acetic acid, nitric acid, sulfuric acid and/or phosphoric acid are preferably used as acids for adjusting the pH, in particular as HX, X being an inorganic or organic acid radical. Suitable silica sols are in particular Levasil 100S as acidic silica sol, but also precipitated silica or dispersed silica.

The solvent and the alcohol formed during the reaction are removed from the reaction mixture. The distillative separation of the solvent and/or of the alcohol is preferably carried out under reduced pressure. The distillative removal is preferably carried out until a temperature which corresponds to the boiling point of water is reached in the top of the column. If the alcohol and/or the solvent could not be substantially completely removed, further water is added and a solvent/water or alcohol/water mixture is further removed, in particular removed by distillation. This procedure is repeated until the alcohol has been substantially removed.

The resulting composition is substantially solvent-free, in particular alcohol-free, i.e. optionally added alcohol as well as the hydrolysis alcohol are preferably completely removed from the reaction system after the approximately complete hydrolysis. The compositions used are therefore substantially free of free alcohols and/or alkoxy radicals if the content is less than 5% by weight, less than 4% by weight, in particular below 2% by weight, preferably below 1, particularly preferably below 0.5% by weight, below 0.1% by weight or below 0.05% by weight.

The pH of the composition after removal of the hydrolysis alcohol and solvent is preferably from 3.0 to 5.4, particularly preferably from 3.5 to 5.4.

The invention furthermore relates to a composition containing substantially water-soluble, bis-aminofunctional silicon compounds substantially free of alkoxy groups, and water and an acid, obtainable by initial introduction of an organic solvent, optionally water, optionally an acid and/or optionally a catalyst and at least one bisaminoalkoxysilane of the formula II

where A is a bis-aminofunctional group of the formula III

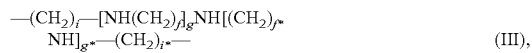

in which i, i*, f, f*, g or g* are identical or different, with i and/or i*=from 0 to 8, f and/or f*=1, 2 or 3, g and/or g*=0, 1 or 2 and $R^1$ corresponds to a linear, cyclic and/or branched alkyl radical having 1 to 4 C atoms, and/or the condensates thereof, and optionally at least one aminoalkylalkoxysilane of the formula IV

where x=0 or 1, $R^2$ corresponding to a linear, branched and/or cyclic alkyl radical having 1 to 4 C atoms and B corresponding to one of the following aminofunctional groups of the general formula Va or Vb

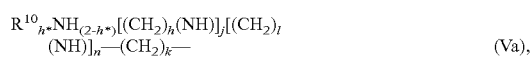

in which $0 \leq h \leq 6$; h*=0, 1 or 2, j=0, 1 or 2; $0 \leq l \leq 6$; n=0, 1 or 2; $0 \leq k \leq 6$ and $R^{10}$ corresponds to a benzyl, aryl, vinyl or formyl radical and/or to a linear, branched and/or cyclic alkyl radical having 1 to 8 C atoms, and/or

in which $0 \leq m \leq 6$ and $0 \leq p \leq 6$, and/or the condensates thereof, and optionally at least one alkylalkoxysilane of the general formula VI $$C—Si(R^5)_y(OR^4)_{3-y} \quad (VI)$$

where y=0 or 1, C corresponding to a linear, branched or cyclic alkyl radical having 1 to 20 C atoms, $R^5$ corresponding to a linear, branched or cyclic alkyl radical having 1 to 12 C atoms and/or aryl radical, $R^4$ corresponding to a linear, branched and/or cyclic alkyl radical having 1 to 4 C atoms, and/or the condensates thereof, and optionally at least one epoxy- or ether-alkoxysilane of the general formula VII $$D-Si(R^7)_u(OR^6)_{3-u} \quad (VII)$$

where u=0 or 1, D corresponding to a 3-glycidyloxyalkyl, 3-glycidyloxypropyl, epoxyalkyl, epoxycycloalkyl or polyalkylglycolalkyl radical or to a polyalkylglycol-3-propyl radical, $R^7$ corresponding to a linear, branched or cyclic alkyl radical having 1 to 4 C atoms and $R^6$ corresponding to a linear, branched and/or cyclic alkyl radical having 1 to 4 C atoms, and/or the condensates thereof, and optionally at least one organofunctional alkoxysilane of the formula VIII $$E-Si(R^8)_v(OR^9)_{3-v} \quad (VIII)$$

where v=0 or 1, $R^8$ corresponding to a linear, branched or cyclic alkyl radical having 1 to 4 C atoms, E corresponding to a radical $R^{8*}—Y_m—(CH_2)_s—$, $R^{8*}$ corresponding to a mono-, oligo- or perfluorinated alkyl radical having 1 to 9 C atoms or to a mono-, oligo- or perfluorinated aryl radical, furthermore Y corresponding to a $CH_2$, O, aryl or S radical and m being 0 or 1 and s being 0 or 2, or to a vinyl, allyl or isopropenyl radical, mercaptoalkyl radical, sulfanealkyl radical, ureidoalkyl radical, to an acryloyloxyalkyl radical or to a linear, branched or cyclic alkoxy radical having 1 to 4 C atoms and $R^9$ corresponding to a linear, branched and/or cyclic alkyl radical having 1 to 4 C atoms, and/or the condensates thereof, hydrolysis, in particular complete hydrolysis, and substantially complete removal of the hydrolysis alcohol and of the solvent.

Compositions prepared by the process according to the invention are stable and clear or in some cases also opalescent to turbid solutions, substantially free of organic solvents, can be diluted with water in any ratio, develop substantially no hydrolysis alcohols on addition of water and have a flashpoint of more than 63° C., preferably of more than 80° C., particularly preferably of more than 93° C.

The invention also relates to a process for the preparation of a composition containing substantially water-soluble, bis-aminofunctional silicon compounds substantially free of alkoxy groups, and water and an acid, as well as a composition obtainable by this process, in which at least one epoxy- or ether-alkoxysilane of the general formula VII $$D-Si(R^7)_u(OR^6)_{3-u} \quad (VII)$$

where u=0 or 1, D corresponding to a 3-glycidyloxyalkyl, 3-glycidyloxypropyl, epoxyalkyl, epoxycycloalkyl or polyalkylglycolalkyl radical or to a polyalkylglycol-3-propyl radical, $R^7$ corresponding to a linear, branched or cyclic alkyl radical having 1 to 4 C atoms and $R^6$ corresponding to a linear, branched and/or cyclic alkyl radical having 1 to 4 C atoms, and/or the condensates thereof, and/or at least one alkylalkoxysilane of the general formula VI $$C—Si(R^5)_y(OR^4)_{3-y} \quad (VI)$$

where y=0 or 1, C corresponding to a linear, branched or cyclic alkyl radical having 1 to 20 C atoms, $R^5$ corresponding to a linear, branched or cyclic alkyl radical having 1 to 12 C atoms and/or aryl radical, $R^4$ corresponding to a linear, branched and/or cyclic alkyl radical having 1 to 4 C atoms, and/or the condensates thereof, and/or at least one organofunctional alkoxysilane of the formula VIII $$E-Si(R^8)_v(OR^9)_{3-v} \quad (VIII)$$

where v=0 or 1, $R^8$ corresponding to a linear, branched or cyclic alkyl radical having 1 to 4 C atoms, E corresponding to a radical $R^{8*}—Y_m—(CH_2)_s—$, $R^{8*}$ corresponding to a mono-, oligo- or perfluorinated alkyl radical having 1 to 9 C atoms or to a mono-, oligo- or perfluorinated aryl radical, furthermore Y corresponding to a $CH_2$, O, aryl or S radical and m being 0 or 1 and s being 0 or 2, or to a vinyl, allyl or isopropenyl radical, mercaptoalkyl radical, sulfanealkyl radical, ureidoalkyl radical, to an acryloyloxyalkyl radical or to a linear, branched or cyclic alkoxy radical having 1 to 4 C atoms and $R^9$ corresponding to a linear, branched and/or cyclic alkyl radical having 1 to 4 C atoms, and/or the condensates thereof, are initially introduced, it being possible in an alternative for the silanes of the formulae IV, VI and/or VIII to be initially introduced as mixtures with at least one silane of the formula II and/or IV, and are at least partly hydrolyzed in the presence of water and in the presence of an acid and/or of a catalyst and water and optionally of a solvent and then, in a second hydrolysis step, in the presence of further water and optionally of further acid, at least one bisaminoalkoxysilane of the formula II $$(OR^1)_3Si-A-Si(OR^1)_3 \quad (II)$$

where A is a bis-aminofunctional group of the formula III $$—(CH_2)_i—[NH(CH_2)_f]_g NH[(CH_2)_{f*} NH]_{g*}—(CH_2)_{i*}— \quad (III),$$

in which i, i*, f, f*, g or g* are identical or different, with i and/or i*=from 0 to 8, f and/or f*=1, 2 or 3, g and/or g*=0, 1 or 2 and $R^1$ corresponds to a linear, cyclic and/or branched alkyl radical having 1 to 4 C atoms, and/or the condensates thereof, and optionally at least one aminoalkylalkoxysilane of the formula IV $$B—Si(R^3)_x(OR^2)_{3-x} \quad (IV)$$

where x=0 or 1, $R^2$ corresponding to a linear, branched and/or cyclic alkyl radical having 1 to 4 C atoms and B corresponding to one of the following aminofunctional groups of the general formula Va or Vb $$R^{10}{}_{h*}—NH_{(2-h*)}[(CH_2)_n(NH)]_j[(CH_2)_l (NH)]_n—(CH_2)_k— \quad (Va),$$

in which 0≦h≦6; h*=0, 1 or 2, j=0, 1 or 2; 0≦l≦6; n=0, 1 or 2; 0≦k≦6 and $R^{10}$ corresponds to a benzyl, aryl, vinyl or formyl radical and/or to a linear, branched and/or cyclic alkyl radical having 1 to 8 C atoms, and/or $$[NH_2(CH_2)_m]_2N(CH_2)_p— \quad (Vb),$$

in which 0≦m≦6 and 0≦p≦6, and/or the condensates thereof, are added and are hydrolyzed and the alcohol is substantially removed.

The silanes of the general formula VI, VII or VIII and/or condensates can be added in succession or as a mixture. The addition of water in the second hydrolysis step can be effected by addition of an aqueous silane mixture or separate addition of water. In particular, the water content during the second hydrolysis step is from 50 to 90% by weight, particularly preferably from 65 to 90% by weight. While the pH during the hydrolysis is in particular from 2.0 to 5.4, preferably from 3.0 to 5.4. The pH can take place at any time by addition of an acid from those mentioned above.

The content of the silicon compounds may be from 7.5 to 40% by weight altogether. According to a preferred embodiment, substantially unhydrolyzed bisaminoalkylalkoxysilane of the formula II is used. According to the invention, at least one bisaminoalkylalkoxysilane of the formula II and one alkylalkoxysilane of the general formula VI are used.

In expedient embodiments, at least one inorganic filler, such as $TiO_2$, $SiO_2$, silica sol, an Aerosil dispersion and/or $Al_2O_3$, can be used during the process. Hydrolysis and condensation are carried out in a temperature range from 30 to 100° C., preferably from 55 to 80° C.

For further removal of the hydrolysis alcohol and optionally added alcohol, further water can be added to the mixture and an alcohol/water mixture can be removed again until the composition is substantially free of alcohols. This procedure can be repeated until the composition is substantially alcohol-free. After removal of the alcohol, the pH of the composition is preferably from 1.0 to 5.4, particularly preferably from 3.0 to 5.4.

The invention also relates to the use of a composition according to the invention in mixtures with further silane-based compositions; in particular, the mixture comprises a composition containing bis-aminofunctional silicon compounds together with a silane-based composition based on alkyl-, alkenyl-, aryl-, epoxy-, dihydroxyalkyl-, aminoalkyl-, polyalkylglycolalkyl-, haloalkyl-, mercaptoalkyl-, sulfanealkyl-, ureidoalkyl- or acryloyloxyalkylfunctional and/or tetraalkoxyfunctional silanes and/or mixtures thereof. In particular, the addition of the composition according to the invention to a mixture comprising a further silane reduces the curing temperature, the repellent properties of the further silane preferably being retained or improved. Examples of this are disclosed in the use examples.

The compositions and/or mixtures according to the invention can be used for the hydrophobization of substrate surfaces, for example having free hydroxyl functions. As a result of the crosslinking with the hydroxyl functions and/or by a possible complex formation and/or reaction of the amino functions, a high strength of the applied layer on the substrate surfaces is achieved. In general, the compositions and/or mixtures can be used for treating or modifying substrate surfaces, in particular for building up barrier layers on substrate surfaces. Preferably, the composition or mixtures are used for the hydrophobization of metal surfaces, such as, for example, stainless steel, aluminum, steel or titanium, of glass surfaces, organic materials, such as plastics surfaces, or in particular of natural fibers, such as, for example, paper, cotton or wood, of mineral surfaces, such as concrete, bricks, sandstone, and further inorganic surfaces. If the compositions are based on silicon compounds containing fluorosilanes, in the form of cocondensates or as a mixture, oleophobic and antigraffiti properties can also be achieved. Further fields of use are opened up in the priming of surfaces comprising glass, metal, mineral surfaces, such as concrete, mortar, screed or sandstone, or organic materials, in particular of natural fibers, such as, for example, paper, cotton or wood. For example, improved adhesion and hence, inter alia, better corrosion protection can be achieved by the priming of metal surfaces. Likewise, a composition according to the invention or a mixture which is based on such a composition can advantageously be used for the corrosion protection of metals, such as iron, steel, stainless steel, aluminum, aluminum alloys, silver, copper—to mention but a few examples. The metals or metal surfaces to be protected from corrosion may be untreated or pretreated; phosphated, chromatized, chromitized or galvanized metal surfaces or galvanized metal surfaces which are additionally chromatized, chromitized or phosphated may be mentioned in particular as examples of treated metal surfaces.

Chromatized metal surfaces are to be understood in general as meaning those which are treated or passivated with a chromium(VI)-containing agent. Analogously, a chromitized metal surface is understood here as meaning metal surfaces which are treated or passivated with a chromium(III)-containing agent. In addition, the aqueous compositions can be used for rock consolidation in mineral oil extraction, for example in the production of prefabricated concrete and/or mortar components, such as pipes, etc., or in aqueous coating or resin formulations. According to a further possible use, the compositions according to the invention can be further modified, in their product properties, in particular by addition of additives and/or fillers. Thus, an improved distribution over a surface can be achieved, for example, by addition of a flow improver. By addition of catalysts, for example zirconium n-propylate, or modification of the pH, the curing of the prepared composition can be accelerated.

The invention also relates to coated or consolidated products which are obtained by using the composition and/or mixtures. Coated glasses, coated acrylic glass, corrosion-protected metals or corrosion-protected, mineral substrates, such as hardened concrete or mortar, or said organic materials, in particular products comprising treated or coated natural fibers, may be mentioned in particular here. Examples of these are reinforcements treated with the composition, which are coated with the composition before their use in concrete. In addition, a still unhardened concrete mixture can also be mixed with a composition according to the invention, processed and then hardened. In this case, it should be ensured that the composition remains processible, for example by choosing the correct pH or other parameters. In this way, for example, hydrophobic, corrosion-resistant concrete or products comprising concrete can be obtained, such as outflow pipes or prefabricated components for buildings. The concrete treated in this manner has a considerably better corrosion resistance to environmental influences.

The invention is illustrated in more detail with reference to the following examples.

EXAMPLES

Analytical Investigations

Residue:
The solids content of the aqueous silane systems is determined as follows:
1 g of the sample is weighed into a small porcelain dish and dried at 105° C. to constant weight in a drying oven.
$SiO_2$ Content:
1.0 to 5.0 g of the sample is mixed with a Kjeldahl tablet and 20 ml of sulfuric acid in a 400 ml beaker and initially slowly heated. The beaker is covered with a watchglass during this procedure. The temperature is increased until the sulfuric acid fumes vigorously and all organic constituents are destroyed and the solution remains clear and light. The cold digestion solution is diluted to about 200 ml with distilled water and briefly boiled (water is allowed to flow under the acid at the edge of the beaker). The residue is filtered through a Weissband filter and washed with hot water until the wash water shows a pH of >4 (pH paper). The filter is dried in a platinum crucible, ashed and ignited for 1 hour at 800° C. in a muffle furnace. After weighing, the residue is heated with hydrofluoric acid until fumes are emitted and the crucible is ignited by means of a blowtorch and optionally ignited again at 800° C. and is weighed after cooling. The difference between the two weighings corresponds to the content of $SiO_2$.

Evaluation: $D \times 100/W$=% by weight of $SiO_2$

D=weight difference before and after the heating with hydrofluoric acid, in mg
100=conversion to %
W=starting weight, in mg
Determination of the Free Methanol and Ethanol Content:
The alcohol determination was carried out by means of GC.
Column: RTX 200 (60 m)
Temperature program: 90-10-25-240-0
Detector: FID
Amount injected: 1.0 µl
Internal standard: 2-butanol
Silanes and silane systems used:

| Trade name | Product description | Manufacturer |
|---|---|---|
| Dynasylan ® Hydrosil 2926 | Aqueous epoxyfunctional siloxane oligomer, alcohol-free | Degussa |
| Dynasylan ® F 8261 | Tridecafluorooctyltriethoxysilane | Degussa |
| Dynasylan ® SIVO 110 | Aqueous silane formulation, VOC-free | Degussa |
| Dynasylan ® 1122 | Bis[triethoxysilylpropyl]amine (bis-AMEO) | Degussa |
| Dynasylan ® MTES | Methyltriethoxysilane | Degussa |
| Dynasylan ® F 8815 | Aqueous fluoroalkylfunctional hydrophobic/oleophobic coating material | Degussa |
| TYZOR NPZ | Zirconium n-propylate | Du Pont |
| Levasil 100S/45% | Aqueous silica sol, particle size 30 nm, pH = 4; concentration 45% N-Formyl-3-aminopropyltriethoxy-silane (triethoxysilylpropyl-formamide) | H.C. Starck GmbH |
| Dynasylan ® AMEO | 3-Aminopropyltriethoxysilane | Degussa |
| Dynasylan ® GLYMO | 3-Glycidyloxypropyltrimethoxysilane | Degussa |
| Dynasylan ® PTMO | Propyltrimethoxysilane | Degussa |
| Dynasylan ® VTMO | Vinyltrimethoxysilane | Degussa |

Example 1

592.84 g of water and 17.16 g of formic acid (concentration of HCOOH=85%) are initially introduced under a nitrogen atmosphere into a stirred apparatus having a metering device and a reflux condenser. 90.0 g of bis-AMEO are then metered in via the metering device. The pH is 3.5. Stirring is effected for 3 h at 60° C. Thereafter, the ETOH/water mixture is distilled off at from 60 to 65° C. and from 130 to 200 mbar. The weight of residue obtained is 600 g. The residue is filtered via a pressure filter (Seitz T-950). A clear, slightly yellowish liquid which has a pH of 3.5 and is storage-stable is obtained.
Residue: 9.4% (w/w)
$SiO_2$ content: 3.1%
Free ethanol: 1.8%

Example 2

598.6 g of water and 10.49 g of formic acid (concentration of HCOOH=85%) are initially introduced under a nitrogen atmosphere into a stirred apparatus having a metering device and reflux condenser. 75.0 g of bis-AMEO are then metered in via the metering device. The pH is 4.2. Stirring is effected for 1 h at 60° C. and thereafter 28.91 g of PTMO are metered and the reaction mixture is heated to 60° C. for a further 2 h. Thereafter, the alcohol/water mixture is distilled off at from 60 to 65° C. and from 130 to 200 mbar. The weight of residue obtained is 600 g. The residue is filtered via a pressure filter (Seitz T-950). A clear, slightly yellowish liquid which has a pH of 4.2 and is storage-stable is obtained.
Residue: 10.5% (w/w)
$SiO_2$ content: 4.8%
Free methanol: 0.8%
Free ethanol: 1.4%

Example 3

597.41 g of water and 36.97 g of formic acid (concentration of HCOOH=85%) are initially introduced under nitrogen into a stirred apparatus having a metering device and reflux condenser. 90.0 g of bis-AMEO and 90.0 g of AMEO and 30 g of PTMO are then metered in via the metering device. The pH is 4.03. Stirring is effected for 3 h at 60° C. Thereafter, the alcohol/water mixture is distilled off at from 60 to 65° C. and from 130 to 200 mbar. The weight of the residue obtained is 600 g. The residue is filtered via a pressure filter (Seitz T-950). A clear, slightly yellowish liquid which has a pH of 3.86 and is storage-stable is obtained.
Residue: 22.2% (w/w)
$SiO_2$ content: 9.1%
Free methanol: 0.3%
Free ethanol: 1.2%
Flashpoint: >95° C.

Example 4

597.41 g of water and 30.0 g of formic acid (concentration of HCOOH=85%) are initially introduced under nitrogen into a stirred apparatus having a metering device and reflux condenser. 90.0 g of bis-AMEO and 90.0 g of AMEO and 60.0 g of PTMO are then metered in via the metering device. A further 4.09 g of formic acid are added. The pH is 5.39. Stirring is effected for 3 h at 60° C. Thereafter, the alcohol/water mixture is distilled off at from 60 to 65° C. and from 130 to 200 mbar. The weight of the residue obtained is 600 g. The residue is filtered via a pressure filter (Seitz T-950). A clear, slightly yellowish liquid which has a pH of 5.4 and is storage-stable is obtained.
Residue: 21.9% (w/w)
$SiO_2$ content: 10.0%
Free methanol: 0.7%
Free ethanol: 1.0%

Example 5

400.00 g of water and 4.75 g of formic acid (concentration of HCOOH=85%) are initially introduced under nitrogen into a 1 l stirred apparatus having a metering device and reflux condenser. 40.0 g of bis-AMEO are metered in via the metering device. A further 1.55 g of formic acid are added. The pH is 4.17. Stirring is effected for 90 min at 60° C. Thereafter, 40 g of PTMO are metered in and stirring is effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet. A clear, slightly yellowish liquid which has a pH of 4.11 and is storage-stable is obtained.
Residue: 11.8% (w/w)
SiO$_2$ content: 6.1%
Free methanol: 0.1%
Free ethanol: <0.1%

Example 6

400.00 g of water and 4.75 g of formic acid (concentration of HCOOH=85%) are initially introduced under a nitrogen atmosphere into a 1 l stirred apparatus having a metering device and reflux condenser. 40.0 g of bis-AMEO are metered in via the metering device. A further 1.45 g of formic acid are added. The pH is 4.15. Stirring is effected for 90 min (including metering time) at 60° C. Thereafter, 32 g of PTMO are metered in and stirring is effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet. A clear, slightly yellowish liquid which has a pH of 4.10 and is storage-stable is obtained.
Residue: 10.1% (w/w)
SiO$_2$ content: 5.1%
Free methanol: 0.1%
Free ethanol: 1.1%

Example 7

400.00 g of water and 2.8 g of formic acid (concentration of HCOOH=85%) are initially introduced under nitrogen into a 1 l stirred apparatus having a metering device and reflux condenser. 20.0 g of bis-AMEO are metered in via the metering device. A further 0.54 g of formic acid is added. The pH is 4.28. Stirring is effected for 90 min at 60° C. Thereafter, 40.0 g of PTMO are metered in and the batch is stirred for a further 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet. A clear, slightly yellowish liquid which has a pH of 4.3 and is storage-stable is obtained.
Residue: 8.9% (w/w)
SiO$_2$ content: 4.9%
Free methanol: 0.1%
Free ethanol: 0.3%
Flashpoint: >95° C.

Example 8

400.00 g of water and 2.8 g of formic acid (concentration of HCOOH=85%) are initially introduced in a nitrogen atmosphere into a 1 l stirred apparatus having a metering device and reflux condenser. 20.0 g of bis-AMEO are metered in via the metering device. A further 0.50 g of formic acid is added. The pH is 4.24. Stirring is effected for 90 min at 60° C. Thereafter, a mixture of 32.0 g of PTMO and 8.0 g of dimethyldimethoxysilane is metered in and stirring is effected for a further 2 hours at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet. A clear, slightly yellowish liquid which has a pH of 4.0 and is storage-stable is obtained.
Residue: 8.8% (w/w)
SiO$_2$ content: 5.1%
Free methanol: 0.7%
Free ethanol: 0.2%

Example 9

400.00 g of water and 8.3 g of formic acid (concentration of HCOOH=85%) are initially introduced under nitrogen into a 1 l stirred apparatus having a metering device and reflux condenser. 40.0 g of bis-AMEO are metered in via the metering device. The pH is 3.60. Stirring is effected for 60 min at 60° C. Thereafter, a mixture of 40.0 g of PTMO and 10 g of AMEO are metered and stirring is effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet. A clear, slightly yellowish liquid which has a pH of 3.8 and is storage-stable is obtained.
Residue: 13.6% (w/w)
SiO$_2$ content: 7.1%
Free methanol: 1.2%
Free ethanol: 1.0%

Example 10

400.00 g of water and 10.8 g of formic acid (concentration of HCOOH=85%) are initially introduced in a nitrogen atmosphere into a 1 l stirred apparatus having a metering device and reflux condenser. 40.0 g of bis-AMEO are metered in via the metering device. The pH is 3.25. Stirring is effected for 60 min at 60° C. Thereafter, a mixture of 40.0 g of PTMO and 10 g of DAMO is metered and stirring is effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet. A clear, slightly yellowish liquid which has a pH of 3.38 and is storage-stable is obtained.
Residue: 14.3% (w/w)
SiO$_2$ content: 7.0%
Free methanol: 1.3%
Free ethanol: 0.6%

Example 11

150 g of the aqueous product Dynasylan® F 8815 are initially introduced under nitrogen into a 1 l stirred apparatus having a metering device and reflux condenser. 60 g of distilled H$_2$O and 1.1 g of formic acid (concentration of HCOOH=85%) are then added with stirring. 7.5 g of bis-AMEO are then metered in via the metering device. Stirring is effected for 90 min at 60° C. Thereafter, the alcohol/water mixture is distilled off at from 60 to 65° C. and from 130 to 200 mbar. The weight of residue obtained is 200 g. The product is filtered at room temperature via a Seitz T-950 filter sheet. An opalescent, slightly yellowish liquid which has a pH of 4.41 and is storage-stable is obtained.
Residue: 4.9% (w/w)
SiO$_2$ content: 1.4%
Free methanol: 0.3%
Free ethanol: 3.8%

Example 12

200.00 g of ethanol and 20 g of water and 2.9 g of formic acid (concentration of HCOOH=85%) are initially introduced under nitrogen into a 1 l stirred apparatus having a metering device and reflux condenser. 20.0 g of bis-AMEO and 10 g of Dynasylan® F 8261 are metered in via the metering device. A further 2.85 g of formic acid are added. The pH is 3.45. Stirring is effected for 90 min at 60° C. 200 g of water are then slowly added. The solution remains homogeneous and is slightly opalescent. The mixture is then stirred for 2 h at 65° C. Thereafter, a further 200 g of water are added and the ethanol/water mixture is then removed at from 60 to 65° C. and from 130 to 200 mbar. The weight of residue obtained is 400 g. The product is filtered at room temperature via a Seitz T-950 filter sheet. A clear, slightly opalescent liquid which has a pH of 3.70 and is storage-stable is obtained.

Residue: 4.9% (w/w)
$SiO_2$ content: 1.3%
Free methanol: <0.1%
Free ethanol: 2.1%

Example 13

400.00 g of water and 2.8 g of formic acid (concentration of HCOOH=85%) are initially introduced under nitrogen into a 1 l stirred apparatus having a metering device and reflux condenser. 20.0 g of bis-AMEO are metered in via the metering device. The pH is 4.24. Stirring is effected for 90 min at 60° C. Thereafter, a mixture of 40.0 g of PTMO and 10 g of GLYMO is metered in and stirring is effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, slightly yellowish liquid which has a pH of 4.4 and is storage-stable is obtained.

Residue: 10.9% (w/w)
$SiO_2$ content: 5.6%
Free methanol: 0.7%
Free ethanol: 2.0%

100 g of demineralized water are added again to the batch (400 g) and about 100 of alcohol/water mixture are distilled off at from about 130 to 200 mbar. The weight of residue obtained is 400 g.

A clear yellowish liquids is obtained.
Free ethanol content <0.1% (w/w)
Free methanol content <0.1% (w/w)
Flashpoint: >95° C.

Example 14

400.00 g of water and 2.8 g of formic acid (concentration of HCOOH=85%) are initially introduced under a nitrogen atmosphere into a 1 l stirred apparatus having a metering device and reflux condenser. 20.0 g of bis-AMEO are metered in via the metering device. A further 1.8 g of formic acid are added. The pH is 4.21. Stirring is effected for 90 min at 60° C. Thereafter, a mixture of 32.0 g of PTMO and 18.0 g of GLYMO is metered in and stirring is effected for 2 h at 65° C. Thereafter, the alcohol/water mixture is removed by distillation at from 60 to 65° C. and from 130 to 200 mbar. The weight of residue obtained is 400 g. The product is filtered at room temperature via a Seitz T-950 filter sheet. A clear, yellowish liquid which has a pH of 4.35 and is storage-stable is obtained.

Residue: 11.4% (w/w)
$SiO_2$ content: 5.5%
Free methanol: 1.5%
Free ethanol: 0.4%

Example 15

400.00 g of water and 2.8 g of formic acid (concentration of HCOOH=85%) are initially introduced under nitrogen into a 1 l stirred apparatus having a metering device and reflux condenser. 20.0 g of bis-AMEO are metered in via the metering device. The pH is 4.3. Stirring is effected for 90 min at 60° C. Thereafter, 40.0 g of MTES (methyltriethoxysilane) are metered in and stirring is effected for 2 h at 65° C. Thereafter, the alcohol/water mixture is removed by distillation at from 60 to 65° C. and from 130 to 200 mbar. The weight of residue obtained is 400 g. The product is filtered at room temperature via a Seitz T-950 filter sheet. A clear, yellowish liquid which has a pH of 4.35 and is storage-stable is obtained.

Residue: 10.7% (w/w)
$SiO_2$ content: 6.0%
Free methanol: <0.1%
Free ethanol: 0.8%

Example 16

In a 1 l stirred apparatus having a metering device and reflux condenser, first 4.8 g of glacial acetic acid (100% strength acetic acid) are added at room temperature to 40.0 g of GLYMO under N2. After 5 min, 4.8 g of zirconium n-propylate are added and after a further 5 min a mixture of 83.7 g of water and 12.0 g of Levasil 100S/45% is added via the metering device. The solution is slightly opaque and the pH is 3.1. During the addition of Levasil 100S/45%, the temperature increases slightly. The solution is then heated to 65° C. for 2 h. Thereafter, the solution is diluted with 400 g of water and heated to 65° C. Thereafter, a further 10.6 g of acetic acid are added and subsequently 75.0 g of bis-AMEO are slowly metered. The pH is 4.5. The batch is kept at 65° C. for 2 h with stirring. The methanol/ethanol/water mixture is then distilled off at from 60 to 65° C. The weight of residue obtained is 500 g. The product is filtered at room temperature via a Seitz T-950 filter sheet.

An opaque, yellowish liquid which has a pH of 4.67 and is storage-stable to a certain extent is obtained.

Residue: 16.9% (w/w)
$SiO_2$ content: 6.5%
Free methanol: 0.4%
Free ethanol: 0.5%

Example 17

597.41 g of water and 30 g of formic acid (concentration of HCOOH=85%) are initially introduced into a stirred apparatus having a metering device and reflux condenser. 90.0 g of bis-AMEO and 90 g of AMEO and 60 g of PTMO are then metered in via the metering device. A further 4.09 g of formic acid are added. The pH is 5.39. Stirring is effected for 3 h at 60° C. Thereafter, the alcohol/water mixture is distilled off at from 60 to 65° C. and from 130 to 200 mbar. The weight of residue obtained is 600 g. The product is filtered at room temperature via a Seitz T-950 filter sheet. A clear, yellowish liquid which has a pH of 5.4 and is storage-stable is obtained.

Residue: 21.9% (w/w)
$SiO_2$ content: 10.0%
Free methanol: 0.7%
Free ethanol: 1.0%

Example 18

200.00 g of ethanol and 20 g of water and 1.4 g of formic acid (concentration of HCOOH=85%) are initially introduced into a 1 l stirred apparatus having a metering device and reflux condenser. 10.0 g of bis-AMEO and 7.5 g of Dynasylan® F 8261 are metered in via the metering device. A further 2.01 g of formic acid are added. The pH is 3.53. Stirring is effected for 90 min at 60° C. 100 g of water are then slowly added. The mixture is then stirred for 2 h at 65° C. Thereafter, a further 150 g of water are added and the ethanol/water mixture is then removed at from 60 to 65° C. and from 130 to 200 mbar. The weight of residue obtained is 200 g. The product is filtered at room temperature via a Seitz T-950 filter sheet.

An opalescent, yellowish liquid which has a pH of 3.85 and is storage-stable is obtained.
Residue: 5.8% (w/w)
$SiO_2$ content: 1.4%
Free ethanol: 2.0%

Example 19

200.00 g of ethanol and 20 g of water and 1.8 g of formic acid (concentration of HCOOH=85%) are initially introduced into a 1 l stirred apparatus having a metering device and reflux condenser. 10.0 g of bis-AMEO, 1.0 g of AMEO and 9 g of Dynasylan® F 8261 are metered in via the metering device. A further 0.65 g of formic acid is added. The pH is 3.52. Stirring is effected for 90 min at 60° C. 100 g of water are then slowly added. The mixture is then stirred for 2 h at 65° C. Thereafter, a further 150 g of water are added and the ethanol/water mixture is then removed at from 60 to 65° C. and from 130 to 200 mbar. The weight of residue obtained is 200 g. The product is filtered at room temperature via a Seitz T-950 filter sheet.

An opalescent, yellowish liquid which has a pH of 3.78 and is storage-stable is obtained.
Residue: 6.3% (w/w)
$SiO_2$ content: 1.7%
Free ethanol: 3.4%

Example 20

400.00 g of water and 4.75 g of formic acid (concentration of HCOOH=85%) are initially introduced into a 1 l stirred apparatus having a metering device and reflux condenser. A mixture of 40.0 g of bis-AMEO+40 g of MTES (methyltriethoxysilane) is metered in via the metering device. A further 2.40 g of formic acid are added. The pH is 3.99. Stirring is effected for 90 min at 60° C. Stirring is then effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.05 and is storage-stable is obtained.
Residue: 9.9% (w/w)
$SiO_2$ content: 5.7%
Free ethanol: 0.8%

Example 21

400.00 g of water and 4.75 g of formic acid (concentration of HCOOH=85%) are initially introduced into a 1 l stirred apparatus having a metering device and reflux condenser. A mixture of 40.0 g of bis-AMEO and 60 g of MTES (methyltriethoxysilane) is metered in via the metering device. The pH is 4.3. Stirring is effected for 90 min at 60° C. Thereafter, 10 g of GLYMO are slowly metered in and stirring is effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.38 and is storage-stable is obtained.
Residue: 13.6% (w/w)
$SiO_2$ content: 8.4%
Free methanol: 0.1%
Free ethanol: 0.6%

Example 22

400.00 g of water and 2.8 g of formic acid (concentration of HCOOH=85%) are initially introduced into a 1 l stirred apparatus having a metering device and reflux condenser. 20.0 g of bis-AMEO are metered in via the metering device. The pH is 4.23. Stirring is effected for 90 min at 60° C. Thereafter, 40.0 g of Dynasylan® 4144 are metered in and stirring is effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.45 and is storage-stable is obtained.
Residue: 12.4% (w/w)
$SiO_2$ content: 2.3%
Free methanol: 0.2%
Free ethanol: 0.1%

Example 23

400.00 g of water and 2.8 g of formic acid (concentration of HCOOH=85%) are initially introduced into a 1 l stirred apparatus having a metering device and reflux condenser. 20.0 g of bis-AMEO are metered in via the metering device. The pH is 4.21. Stirring is effected for 90 min at 60° C. Thereafter, 60.0 g of Dynasylan® 4144 are metered in and stirring is effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.37 and is storage-stable is obtained.
Residue: 16.0% (w/w)
$SiO_2$ content: 2.0%
Free methanol: 0.1%
Free ethanol: 0.1%

Example 24

400.00 g of water, 12.0 g of Levasil 100S and 4.75 g of formic acid (concentration of HCOOH=85%) are initially introduced into a 1 l stirred apparatus having a metering device and reflux condenser. A mixture of 40.0 g of bis-AMEO and 60 g of MTES (methyltriethoxysilane) is metered in via the metering device. A further 2.18 g of formic acid are added. The pH is 4.33. Stirring is effected for 90 min at 60° C. Stirring is then effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.43 and is storage-stable is obtained.
Residue: 12.9% (w/w)
$SiO_2$ content: 8.4%
Free ethanol: 0.5%

Example 25

400.00 g of water and 5.0 g of an 85% strength phosphoric acid are initially introduced into a 1 l stirred apparatus having a metering device and reflux condenser. A mixture of 40.0 g of bis-AMEO and 60 g of MTES (methyltriethoxysilane) is metered in via the metering device. A further 6.25 g of formic acid are added. The pH is 4.19. Stirring is effected for 90 min at 60° C. Stirring is then effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.32 and is storage-stable is obtained.
Residue: 13.3% (w/w)
$SiO_2$ content: 7.9%
Free ethanol: 2.7%

100 g of demineralized water is added again to the batch (400 g) and about 100 of alcohol/water mixture are distilled off at from about 130 to 200 mbar. The weight of residue obtained is 400 g.

A clear yellowish liquids having a free ethanol content of <0.1% (w/w) is obtained.
Flashpoint: >95° C.

Example 26

400.00 g of water and 7.9 g of a 70% strength nitric acid are initially introduced into a 1 l stirred apparatus having a metering device and reflux condenser. A mixture of 40.0 g of bis-AMEO and 60 g of MTES (methyltriethoxysilane) are metered in via the metering device. A further 0.95 g of formic acid is added. The pH is 4.15. Stirring is effected for 90 min at 60° C. Stirring is then effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.15 and is storage-stable is obtained.
Residue: 11.8% (w/w)
$SiO_2$ content: 7.2%
Free ethanol: 0.8%

Example 27

400.00 g of water and 4.0 g of formic acid (concentration of HCOOH=85%) are initially introduced into a 1 l stirred apparatus having a metering device and reflux condenser. 100 g of aqueous product Dynasylan® HS 2926 are then added with thorough stirring. 40.0 g of bis-AMEO are then metered in via the metering device. The pH is 4.15. Stirring is effected for 90 min at 60° C. and then for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.25 and is storage-stable is obtained.
Residue: 13.5% (w/w)
$SiO_2$ content: 5.0%
Free ethanol: 0.2%

Example 28

400.00 g of water and 4.0 g of formic acid (concentration of HCOOH=85%) are initially introduced into a 1 l stirred apparatus having a metering device and reflux condenser. 120 g of the aqueous product Dynasylan® HS 2926 are then added with thorough stirring. 32.0 g of bis-AMEO are then metered in via the metering device. The pH is 4.03. Stirring is effected for 90 min at 60° C. and then for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.10 and is storage-stable is obtained.
Residue: 14.4% (w/w)
$SiO_2$ content: 4.9%
Free ethanol: <0.1%

Example 29

400.00 g of water and 4.0 g of formic acid (concentration of HCOOH=85%) are initially introduced into a 1 l stirred apparatus having a metering device and reflux condenser. Thereafter, 12 g of Levasil 100S/45 are added with stirring and 120 g of the aqueous product Dynasylan® HS 2926 are added. 32.0 g of bis-AMEO are then slowly metered in via the metering device. The pH is 4.20. Stirring is effected for 90 min at 60° C. Thereafter, 20 g of VTMO are slowly added via a dropping funnel and stirring is then effected for 2 h at 65° C. Thereafter, alcohol/water mixture is distilled off at from 60 to 65° C. and from 130 to 200 mbar. The weight of residue obtained is 400 g. The product is filtered at room temperature via a Seitz T-950 filter sheet.

An opaque, yellowish liquid which has a pH of 4.23 and is storage-stable is obtained.
Residue: 18.1% (w/w)
$SiO_2$ content: 8.2%
Free methanol: <0.1%
Free ethanol: <0.1%

Example 30

400.00 g of water and 3.2 g of formic acid (concentration of HCOOH=85%) are initially introduced into a 1 l stirred apparatus having a metering device and reflux condenser. 30.0 g of bis-AMEO are metered in via the metering device. A further 2.45 g of formic acid are added. The pH is 4.27. Stirring is effected for 90 min at 60° C. Thereafter, 30.0 g of GLYMO are metered in and stirring is effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.36 and is storage-stable is obtained.
Residue: 10.6% (w/w)
$SiO_2$ content: 4.1%
Free methanol: 0.1%
Free ethanol: <0.1%

Example 31

400.00 g of water and 4.3 g of formic acid (concentration of HCOOH=85%) and 12 g of Levasil 100 S are initially introduced into a 1 l stirred apparatus having a metering device and reflux condenser. The pH is 4.17. 30.0 g of bis-AMEO are metered in via the metering device. Stirring is effected for 90 min at 60° C. Thereafter, 30.0 g of GLYMO are metered in and stirring is effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.30 and is storage-stable is obtained.
Residue: 11.9% (w/w)
SiO$_2$ content: 5.2%
Free methanol: 0.7%
Free ethanol: 0.6%

Example 32

400 g of water and 6.9 g of formic acid (concentration of HCOOH=85%) are initially introduced into a 1 l stirred apparatus having a double jacket, metering device and reflux condenser. The pH is 4.34. 50.0 g of bis-AMEO are metered in via the metering device. Stirring is effected for 90 min at 60° C. Thereafter, 9.6 g of DMDMO are metered in and stirring is effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

An opaque, yellowish liquid which has a pH of 4.16 and is storage-stable is obtained.
Residue: 8.90% (w/w)
SiO$_2$ content: 4.3%
Free methanol: 0.1%
Free ethanol: 0.3%

Example 33

400.00 g of water and 7.8 g of hydrochloric acid (concentration of HCl=37%) are initially introduced into a 1 l stirred apparatus having a metering device and reflux condenser. 34.0 g of bis-AMEO are metered in via the metering device. The pH is adjusted to 2.04 with 0.33 g of hydrochloric acid (37% strength). Stirring is effected for 30 min at 60° C. Thereafter, 40 g of MTES (methyltriethoxysilane) are metered in and stirring is effected for 2 h at 65° C. A further 3 g of bis-AMEO are then added. The pH increases to 5.4 thereby. By a further addition of 0.37 g of hydrochloric acid (37% strength), the pH is adjusted to 3.2. A further 3.0 g of bis-AMEO are then added, the pH increasing to 6.0. By addition of 0.74 g of hydrochloric acid (37% strength), the pH is adjusted to 4.1. Thereafter, the alcohol/water mixture is separated off at a bottom temperature of 65° C. and a reduced pressure of from 130 to 200 mbar. The weight of residue obtained is 400 g. The product is filtered at room temperature via a Seitz T-950 filter sheet.

An opaque, yellowish liquid which has a pH of 4.30 and is storage-stable is obtained.
Residue: 9.1% (w/w)
SiO$_2$ content: 5.7%
Free ethanol: 1.7%

Example 34

400.00 g of water and 9.3 g of hydrochloric acid (concentration of HCl=37%) are initially introduced into a 1 l stirred apparatus having a metering device and reflux condenser. 40.0 g of bis-AMEO are metered in via the metering device. The pH is adjusted to 2.05 with 2.41 g of hydrochloric acid (37% strength). Stirring is effected for 30 min at 60° C. Thereafter, 40 g of MTES (methyltriethoxysilane) are metered in and stirring is effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 1.75 and is storage-stable is obtained.
Residue: 9.6% (w/w)
SiO$_2$ content: 5.7%
Free ethanol: 1.5%

Example 35

426.9 g of water and 5.1 g of formic acid (concentration of HCOOH=85%) are initially introduced into a 1 l stirred apparatus having a double jacket, metering device and reflux condenser. 40.0 g of bis-AMEO are metered in via the metering device. A further 0.55 g of formic acid is added. The pH is 4.30. Stirring is effected for 90 min at 60° C. A mixture of 14.0 g of N-formyl-3-aminopropyltriethoxysilane and 14.0 g of MTES is then metered in. The pH is 4.3. Stirring is then effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.1 and is storage-stable is obtained.
Residue: 9.3% (w/w)
SiO$_2$ content: 4.5%
Free ethanol: 0.2%

Example 36

400.0 g of water and 6.0 g of formic acid (concentration of HCOOH=85%) are initially introduced into a 1 l stirred apparatus having a double jacket, metering device and reflux condenser. 50.0 g of bis-AMEO are metered in via the metering device. A further 2.51 g of formic acid are added. The pH is 4.28. Stirring is effected for 90 min at 60° C. Thereafter, 19.20 g of N-formyl-3-aminopropyltriethoxysilane are metered in. The pH is 4.3. Stirring is then effected for 2 h at 65° C. Thereafter, the alcohol/water mixture is distilled off at from 60 to 65° C. and from 130 to 200 mbar. The weight of residue obtained is to be 400 g. The product was filtered at room temperature via a Seitz T-950 filter sheet.

A clear, yellowish liquid which has a pH of 4.07 and is storage-stable is obtained.
Residue: 12.7% (w/w)
SiO$_2$ content: 5.1%
Free ethanol: 0.2%

Example 37

40.0 g of bis-AMEO, 40.0 g of MTES and 40.0 g of ethanol are initially introduced into a 250 ml multi-necked flask having a magnetic stirrer and temperature apparatus and N2 blanketing. 4.0 g of water are metered in with stirred. The reaction mixture is stirred for 1 h at 60° C. 400.0 g of water and 4.75 g of formic acid (concentration of HCOOH=85%) are initially introduced into a 1 l stirred apparatus having a metering device and reflux condenser. The prehydrolyzed reaction mixture is metered in via the metering device at 60° C. A further 1.00 g of formic acid is added. The pH is 4.25. Stirring is effected for 90 min at 60° C. Stirring is then effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.24 and is storage-stable is obtained.
Residue: 9.9% (w/w)
SiO$_2$ content: 5.1%
Free ethanol: 0.3%

Example 38

40.0 g of bis-AMEO, 40.0 g of MTES and 40.0 g of ethanol are initially introduced into a 250 ml multi-necked flask having a magnetic stirrer and temperature apparatus and N2 blanketing. 8.0 g of water are metered in with stirring. The reaction mixture is stirred for ¼ h at 60° C. 400.0 g of water and 4.75 g of formic acid (concentration of HCOOH=85%) are initially introduced into a 1 l stirred apparatus having a metering device and reflux condenser. The prehydrolyzed reaction mixture is metered in via the metering device at 60° C. A further 0.93 g of formic acid is added. The pH is 4.27. Stirring is effected for 90 min at 60° C. Stirring is then effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.3 and is storage-stable is obtained.
Residue: 10.2% (w/w)
$SiO_2$ content: 6.0%
Free ethanol: 1.4%

Example 39

40.0 g of bis-AMEO, 40.0 g of MTES and 40.0 g of ethanol are initially introduced into a 250 ml multi-necked flask having a magnetic stirrer and temperature apparatus and N2 blanketing. 5.5 g of formic acid (concentration of HCOOH=85%) are added rapidly with stirring. 3.2 g of water are then metered in. The reaction mixture is stirred at 60° C. for 1 hour. 400.00 g of water are initially introduced into a 1 l stirred apparatus having a metering device and reflux condenser. The prehydrolyzed mixture is metered in at 60° C. via the metering device. A further 0.23 g of formic acid is added. The pH is 4.10. Stirring is effected for 90 min at 60° C. Stirring is then effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-950 filter sheet.

A clear, yellowish liquid which has a pH of 4.00 and is storage-stable is obtained.
Residue: 10.0% (w/w)
$SiO_2$ content: 5.8%
Free ethanol: 1.0%

Example 40

5000.00 g of water and 95.34 g of an 85% strength formic acid are initially introduced into a 10 l stirred apparatus having a metering device and reflux condenser. 750 g of bis-AMEO are slowly metered in via the metering device. A further 11.66 g of formic acid are added. The pH is 4.30. Stirring is effected for 3 hours at 65° C. Thereafter, the alcohol/water mixture is distilled off at from 60 to 65° C. and from 130 to 200 mbar. The weight of residue obtained is 5000 g. The product is filtered at room temperature via a Seitz T-950 filter sheet.

A clear, yellowish liquid which has a pH of 4.25 and is storage-stable is obtained.
Residue: 8.9% (w/w)
$SiO_2$ content: 3.7%
Free ethanol: 1.7%

Example 41

400.00 g of water, 12 g of Levasil 100S and 4.75 g of formic acid (concentration of HCOOH=85%) are initially introduced into a 1 l stirred apparatus having a metering device and reflux condenser. A mixture of 40.0 g of bis-AMEO and 80 g of MTES (methyltriethoxysilane) is metered in via the metering device. A further 2.54 g of formic acid are added. The pH is 4.24. Stirring is effected for 90 min at 60° C. Stirring is then effected for 2 h at 65° C. Thereafter, the alcohol/water mixture is distilled off at from 60 to 65° C. and from 130 to 200 mbar. The weight of residue obtained is 400 g. The product is filtered at room temperature via a Seitz T-2100 filter sheet.

A clear, yellowish liquid which has a pH of 4.27 and is storage-stable is obtained.
Residue: 14.9% (w/w)
$SiO_2$ content: 10.2%
Free ethanol: 1.0%

Use Examples

1. Methods 1.1 Coating of the Glass Plates

It should be ensured that the surfaces are cleaned prior to application and in particular are free of grease. Pretreatment of the glass surface (size of the glass plates 0.07 m×0.15 m). The glass plates are cleaned beforehand with isopropanol and activated by abrasion with an aqueous cerium oxide slurry. The dried-on cerium oxide is removed completely with a paper cloth.

The systems from the examples were applied to the cleaned surface by means of a 12 μm knifecoater. The resulting coatings were then cured for at least 12 hours at room temperature.

1.2 Determination of the Pencil Hardness

The pencil hardness test was carried out using the "ERICHSON Scratch Hardness Tester Model 291" on the basis of ISO 15184. The results of these tests are summarized in table 2.

1.3 Boiling Test

The coated glass plates were placed for 1 hour in boiling demineralized water. The result of this test is summarized in tables 2 and 3.

The visual assessment of the coating after the boiling test is effected according to the following rating:
(−)=layer destroyed or detached
(0)=layer present but roughened, loss of water repellency
(+)=layer unchanged 1.5 Measurement of the Static Contact Angle The static contact angle is determined by a multiple measurement using the contact angle measuring instrument G-15 from KRÜSS on the basis of DIN EN 828.

For checking the hydrophobic properties, the static contact angle (CA) was measured using demineralized water. For checking the oleophobic properties, the static contact angle (CA) was measured using Kaydol (mineral oil).

1.6 Treatment of the Mineral Test Specimens

The treatment of the test specimens (cube, edge length=5 cm=0.0015 $m^2$) was effected by immersion in the aqueous silane solutions from the examples. The test specimens were immersed in the aqueous silane system for 2×5 seconds using crucible tongs. The waiting time between the immersion processes was 1 minute. The test specimens were checked after 1 day. The results are shown in table 4.

1.7 Treatment with Dynasylan® F 8815/Example 43 Mixture

The treatment of the concrete surface in use example 5 was effected on concrete slabs (1.5 cm×7.5 cm×15 cm=0.02925 $m^2$) by application once with a brush. After a rest time of 3 days, the accelerated antigraffiti test was carried out.

Testing of Antigraffiti Coatings

Based on: Technical specifications for the assessment of methods, technologies and materials for graffiti removal and prevention of the Gütegemeinschaft Anti Graffiti e.V. (date: May 18, 1998).

The treated concrete surface was sprayed with 3 colors (Edding 800 Permanent Marker black, Dupli-Color acrylic paint RAL 3000 fire red and Genius Pro Aqua paint high-gloss gentian blue). After drying the colors for 1 hour at room temperature, a graffiti cleaner (Profi Clean Gel cleaner) was applied. After an action time of 10 minutes, the surface was treated mechanically with a brush. Thereafter cleaning was effected under running water with a soft brush. The moist concrete slab was dried for 15 minutes at 60° C. in a circulation drying oven and then cooled to room temperature. This stress test was repeated 9 times.

Each time after cleaning, the test result was rated on the dry substrate according to the points mentioned below.

| | |
|---|---|
| Removal 0-30% | (no substantial color removed) = 1 point |
| Removal 30-75% | (partial color removal, colored contour clearly visible) = 2 points |
| Removal 75-90% | (color removed for the most part, outlined shades visible) = 3 points |
| Removal >90% | (effective color removal, outlined pale shades visible) = 4 points |

Complete color removal (individual colored pigments in pores are allowed)=5 points Each time after cleaning, the Ci value was determined by means of the visual assessment of each individual color point. This was calculated as follows.

$Ci$ value=(add point number of the individual color points*20)/(number of color points)$Ci$ value max.=100

| Number of cleaning cycles (Function test + stress test) | Ci value | Test result |
|---|---|---|
| <5 | <65 | Stress test not passed |
| 5 | >65 | Stress test passed |
| 6 to 10 | >70 | Stress test passed with good result |
| 11 to 14 | >75 | Stress test passed with very good result |
| 15 or more | >80 | Stress test passed with excellent result |

1.8 Assessment of the Water Repellency Effect

For determining the water repellency effect, 1 ml of demineralized water was placed on the test specimen using a Pasteur pipette. The tip of the Pasteur pipette must touch the substrate surface. After 10 minutes, the water drop was shaken off and the degree of wetting was assessed visually.

Assessment of the Test Result:

| | | |
|---|---|---|
| 0 = drop exhibits beading | | |
| 1 = drop is not absorbed | → | no wetting |
| 2 = drop is not absorbed | → | half of contact surface wetted |
| 3 = drop is not absorbed | → | contact surface completely wetted |
| 4 = drop somewhat absorbed | → | dark coloration of the contact surface, contact surface completely wetted |
| 5 = 50% absorption of the drop | → | dark coloration of the contact surface |
| 6 = drop completely absorbed | → | dark coloration of the contact surface |

Use Example 1

10.0 g of the product from example 1 were mixed with 1.0 g of the aqueous product Dynasylan® F 8815. The mixture was applied to a cleaned glass plate (size=8×15 cm) using a 12 μm knifecoater. The resulting coatings was dried for 1 hour at room temperature and then postcured for ½ hour at 150° C. in a circulation drying oven. The resulting coating was transparent and very hard and showed very pronounced hydrophobic and oleophobic properties. The layer could not be written on with an Edding 800 Permanent Marker.

Comparative Example for Use Example 1

For comparison with use example 1, the aqueous product Dynasylan® F 8815 was applied to a cleaned glass plate (size=8×15 cm) using a 12 μm knifecoater. The glass surface could not be completely wetted. The resulting coatings was dried for 1 hour at room temperature and then postcured for ½ h hour at 150° C. in a circulation drying oven. The resulting coating was very soft and had a milky appearance.

Use Example 2

5.0 g of the product from example 40 were mixed with 5.0 g of the aqueous product Dynasylan® Hydrosil 2926. The mixture was applied to a cleaned glass plate (size=8×15 cm) using a 12 μm knifecoater. The resulting coatings was dried for 1 week at room temperature. The pencil hardness HB was determined.

Comparative Example for Use Example 2

For comparison with use example 3, the aqueous product Dynasylan® HS 2926 was applied to a cleaned glass plate (size=8×15 cm) using a 12 μm knifecoater. The glass surface could not be completely wetted. The resulting coating did not cure and was very tacky.

Use Example 3

50.0 g of the product from example 43 were mixed with 50.0 g of Dynasylan® F 8815. The resulting coating formulation was applied to a concrete surface (size=1.5 cm×7.5 cm×15 cm) according to the specification in 1.7. The results of this investigation are shown in table 1.

TABLE 1

Results of the antigraffiti test, use example 5

| Cleaning No.: | Edding 800 Permanent Marker | Acrylic paint RAL 3000 fire red | Genius Pro Aqua paint high-gloss gentian blue | Ci value |
|---|---|---|---|---|
| 1 | 4.5 | 4.5 | 5 | 93 |
| 2 | 4.0 | 4.5 | 5 | 90 |
| 3 | 4.0 | 4.5 | 5 | 90 |
| 4 | 4.0 | 4.5 | 4.5 | 87 |
| 5 | 4.0 | 4.5 | 4.5 | 87 |
| 6 | 4.0 | 4.5 | 4.5 | 87 |
| 7 | 4.0 | 4.5 | 4.5 | 87 |
| 8 | 4.0 | 4.5 | 4.5 | 87 |
| 9 | 3.5 | 4.0 | 4.5 | 80 |
| 10 | 3.5 | 4.0 | 4.5 | 80 |

According to the assessment criteria in paragraph 1.7, this test was passed with a good result.

Use Example 4

TABLE 2

Results of the pencil hardness test and of the boiling resistance of selected examples of the transparent homogeneous coatings on glass surfaces

| Example | Time for curing at RT | Pencil hardness | Rating of the boiling resistance |
|---|---|---|---|
| 2 | 3 days | 6H | + |
| 7 | 4 days | 6H | + |
| 9 | 2 months | 6H | + |
| 13 | 8 weeks | 6H | + |
| 14 | 8 weeks | 6H | + |
| 15 | 5 weeks | 6H | + |
| 20 | 5 weeks | 7H | + |
| 24 | 1 day | 3H | + |

Use Example 5

The products from examples 12, 18 and 19 were applied to glass surfaces via the method in 1.1. The curing of the coatings was complete after 1 week. The results are shown in table 3.

TABLE 3

Results of the hydrophobic and oleophobic properties of the surfaces which were produced from the products of examples 12, 18 and 19.

| Example | CA H$_2$O [°] | CA Kaydol [°] | Boiling test 1 h in demineralized H$_2$O |
|---|---|---|---|
| 12 | 99 | 55 | + |
| 18 | 91 | 55 | + |
| 19 | 96 | 59 | + |

The contact angles show the outstanding hydrophobic and oleophobic properties of these coatings.

In addition, the coatings have outstanding water repellency properties.

Use Example 6

A polished stainless steel surface was half-coated with the product from example 41. For this purpose, the formulation from example 41 was applied by means of a sponge. After a crosslinking time of 1 day at room temperature, the coated surface was compared with the uncoated stainless steel surface.

For this purpose, fingerprints were applied to the uncoated surface and to the coated surface. After an action time of 1 day, the fingerprints were wiped off with a paper cloth. The fingerprints remained on the uncoated plate whereas the fingerprints could be easily removed on the coated side. This gives very good antifingerprint properties as a result.

After a boiling test for 1 hour in demineralized water, the coating was fully functional.

Use Example 7

TABLE 4

Assessment of the water repellency effect of coated building materials which were treated by the method in section 1.7).

| | Water repellency effect | | |
|---|---|---|---|
| Example | Lime sandstone | Concrete | Brick |
| 7 | 0 | 0 | 0 |
| Blank values (untreated substrate) | 6 | 5 | 6 |

According to the rating system in section 1.8, outstanding water repellency properties are obtained with the coating from the product of example 7 in the case of all substrates.

Use Example 8

Procedure

Mixtures of Dynasylan® SIVO 110 with the Product from Example 1

Preparation of the formulations in 20 ml scintillation bottles at RT (21-25° C.) by means of a magnetic stirrer: 40.0 g of the product from example 1 were mixed with 60.0 g of SIVO 110. The application to an aluminum test sheet (from Pausch, alloy: 5005H024) cleaned with ethyl acetate was effected about 0.5 h after the mixing. For this purpose, the mixture was applied by means of a 4 μm knifecoater, dried on at RT (21 to 25° C.) and cured in a Heraeus circulation drying oven for 10 min at 150° C. (dry layer thickness <=1 μm).

As a comparative example, an aluminum sheet was coated with SIVO 110 and cured under identical conditions.

Testing of the boiling water resistance: within 24 h after application, the coated aluminum test sheets were placed in boiling water for 2 h and then checked for discolorations/detachment and adhesion (crosshatch test based on DIN EN ISO 2409).

Result: At a drying temperature of 150° C. (10 min), an outstanding boiling water resistance can be achieved on mixing with 40% of the product from example 1. The coating is unchanged and shows good adhesion: crosshatch 0 (based on DIN EN ISO 2409). On the other hand, the product Dynasylan® SIVO 110 shows a strong yellow coloration and complete delamination at a curing temperature of 150° C. after boiling in water. In order to be able to obtain the same properties with Dynasylan® SIVO 110 as with the mixture, the curing temperature must be increased to 220° C.

The coating shown in FIG. 1 on an aluminum test sheet, comprising hydrolyzed epoxysilane condensate, shows a substantial yellow coloration after a two-hour boiling water test, which is present as a dark shadow in FIG. 1. FIG. 2 shows a correspondingly treated aluminum test sheet with a coating comprising bis-aminofunctional silicon compound and hydrolyzed epoxysilane condensate, the content of the bis-aminofunctional silicon compound being 40% by weight and that of the epoxysilane condensate being 60% by weight. This coating remains colorless even after a two-hour boiling water test—no dark shadow is evident in FIG. 2—and furthermore shows good adhesion, which is documented with a crosshatch of 0.

The invention is illustrated in more detail below with reference to the exemplary embodiments shown in the figures.

Figure 1:
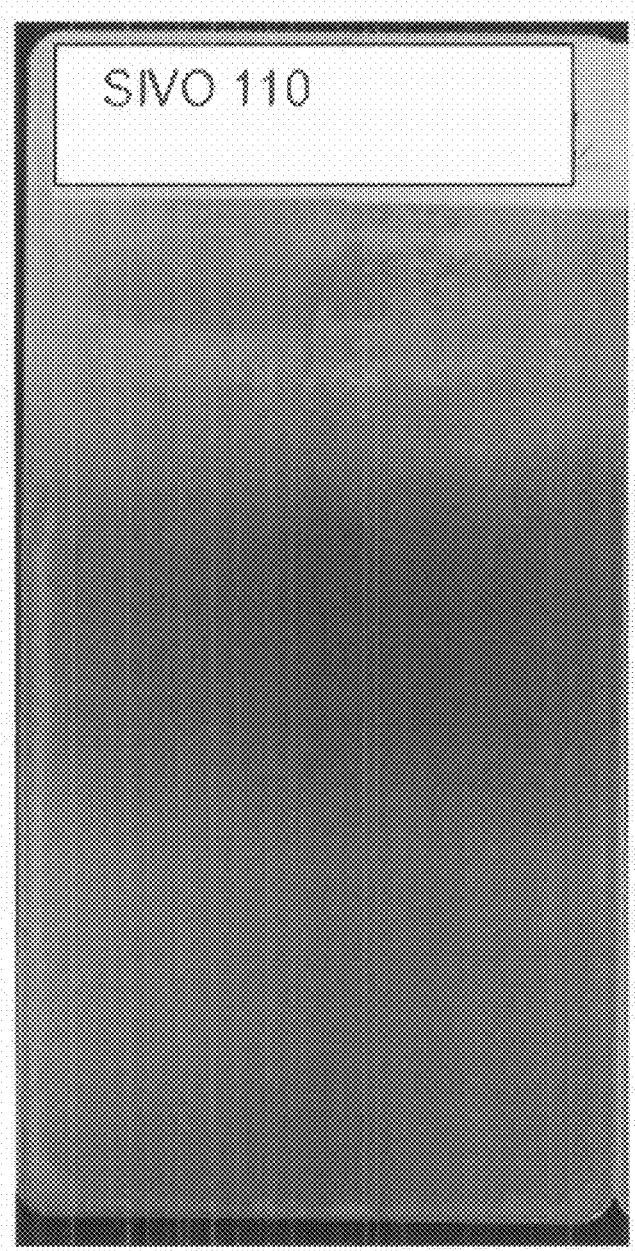
FIG. 1 shows coating with hydrolyzed epoxysilane condensate.
Figure 2:
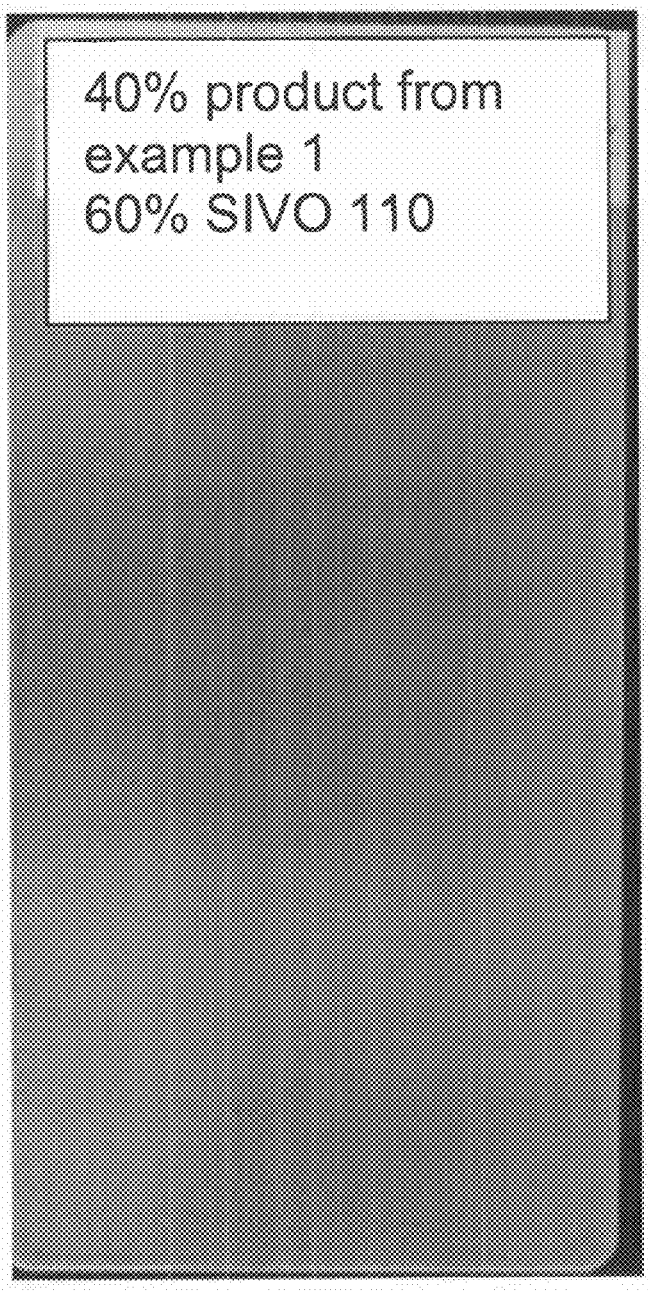
FIG. 2 shows coating comprising bis-aminofunctional silicon compound and hydrolyzed epoxysilane condensate.

The invention claimed is:

1. A composition containing substantially water-soluble, bis-aminofunctional silicon compounds and water, the silicon compounds being derived from alkoxysilanes and having crosslinking structural elements which form chain-like, cyclic, crosslinked and/or three-dimensionally crosslinked structures, at least one structure in idealized form corresponding to the general formula I,

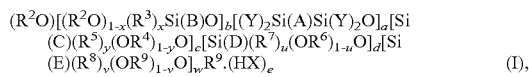  (I), in the structural elements derived from alkoxysilanes, with
A corresponding to a bisaminoalkyl radical,
B corresponding to an aminoalkyl radical,
C corresponding to an alkyl radical,
D corresponding to an epoxy or ether radical and
E corresponding to an organofunctional radical,
Y corresponding to $OR^1$ or, in crosslinked and/or three-dimensionally crosslinked structures, independently of one another, $OR^1$ or $O_{1/2}$,
$R^1$, $R^2$, $R^4$, $R^6$ and/or $R^9$ substantially corresponding to hydrogen and $R^3$, $R^5$, $R^7$ and/or $R^8$ corresponding to organofunctional radicals, and
HX being an acid, in which X is an inorganic or organic acid radical,
with $0 \leq x \leq 1$, $0 \leq y \leq 1$, $0 \leq u \leq 1$, $a \geq 1$, $b \geq 0$, $c \geq 0$, $d \geq 0$, $w \geq 0$, $e \geq 0$ and $(a+b+c+d+w) \geq 2$, and
the composition being substantially free of organic solvents and releasing substantially no more alcohol on crosslinking.

2. The composition as claimed in claim 1,
wherein
A in the structural element corresponds to a bisaminoalkyl radical derived from the general formula II $(OR^1)_3Si-A-Si(OR^1)_3$  (II)

where A is a bis-aminofunctional group of the formula III

  (III), in which i, i*, f, f*, g or g* are identical or different, with i and/or i*=from 0 to 8, f and/or f*=1, 2 or 3, g and/or g*=0, 1 or 2 and $R^1$ corresponds to a linear, cyclic and/or branched alkyl radical having 1 to 4 C atoms.

3. The composition as claimed in claim 1,
wherein
B in the structural element corresponds to an aminofunctional radical derived from the general formula IV $B-Si(R^3)_x(OR^2)_{3-x}$  (IV)

with x=0 or 1, $R^2$ corresponding to a linear, branched and/or cyclic alkyl radical having 1 to 4 C atoms, $R^3$ corresponding to a linear, branched or cyclic alkyl radical having 1 to 12 C atoms and/or aryl radical and B corresponding to one of the following aminofunctional groups of the general formula Va or Vb

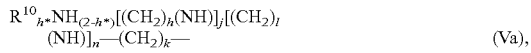  (Va), in which $0 \leq h \leq 6$; h*=0, 1 or 2, j=0, 1 or 2; $0 \leq l \leq 6$; n=0, 1 or 2;

$0 \leq k \leq 6$ and $R^{10}$ corresponds to a benzyl, aryl, vinyl or formyl radical and/or to a linear, branched and/or cyclic alkyl radical having 1 to 8 C atoms, and/or $[NH_2(CH_2)_m]_2N(CH_2)_p-$  (Vb), in which $0 \leq m \leq 6$ and $0 \leq p \leq 6$.

4. The composition as claimed in claim 1,
wherein
C in the structural element corresponds to an alkyl radical derived from the general formula VI $C-Si(R^5)_y(OR^4)_{3-y}$  (VI)

with y=0 or 1, C corresponding to a linear, branched or cyclic alkyl radical having 1 to 20 C atoms, $R^5$ corresponding to a linear, branched or cyclic alkyl radical having 1 to 12 C atoms and/or aryl radical, and $R^4$ corresponding to a linear, branched and/or cyclic alkyl radical having 1 to 4 C atoms.

5. The composition as claimed in claim 1,
wherein
D in the structural element corresponds to an epoxy or ether radical derived from the general formula VII $D-Si(R^7)_u(OR^6)_{3-u}$  (VII)

with u=0 or 1, D corresponding to a 3-glycidyloxyalkyl, 3-glycidyloxypropyl, epoxyalkyl, epoxycycloalkyl or polyalkylglycolalkyl radical or to a polyalkylglycol-3-propyl radical, $R^7$ corresponding to a linear, branched and/or cyclic alkyl radical having 1 to 4 C atoms and $R^6$ corresponding to a linear, branched and/or cyclic alkyl radical having 1 to 4 C atoms.

6. The composition as claimed in claim 1,
wherein
E in the structural element corresponds to an organofunctional radical derived from the general formula VIII $E-Si(R^8)_v(OR^9)_{3-v}$  (VIII)

with v=0 or 1, $R^8$ corresponding to a linear, branched or cyclic alkyl radical having 1 to 4 C atoms,
E corresponding to a radical $R^{8*}-Y_m-(CH_2)_s-$, $R^{8*}$ corresponding to a mono-, oligo- or perfluorinated alkyl radical having 1 to 9 C atoms or to a mono-, oligo- or perfluorinated aryl radical, and Y corresponding to a $CH_2$, O, aryl or S radical, and m being 0 or 1 and s being 0 or 2 and/or
E corresponding to a vinyl, allyl or isopropenyl radical, mercaptoalkyl radical, sulfanealkyl radical, ureidoalkyl radical, to an acryloyloxyalkyl radical or to a linear, branched or cyclic alkoxy radical having 1 to 4 C atoms and
$R^9$ corresponding to a linear, branched and/or cyclic alkyl radical having 1 to 4 C atoms.

7. The composition as claimed in any of claim 1,
wherein
it has a flashpoint above 90° C.

8. The composition as claimed in claim 1,
wherein
it has a stability at room temperature of at least 3 months in a closed container.

9. The composition as claimed in claim 1,
wherein
the acid is formic acid, acetic acid, an acidic silica sol, glacial acetic acid, nitric acid, sulfuric acid and/or phosphoric acid.

10. The composition as claimed in claim 1, wherein
it crosslinks from as low as 0° C.

11. The composition as claimed in claim 10, wherein
it crosslinks at from 15 to 25° C.

12. The composition as claimed in claim 1, wherein
it has a pH of from 1 to 5.4.

13. The composition as claimed in claim 12, wherein
in that
it has a pH of from 3.0 to 5.4.

14. The composition as claimed in claim 13, wherein
it has a pH of from 3.5 to 5.4.

15. The composition as claimed in claim 1, wherein
it has a content of from 7.5 to 40% by weight of silicon compounds, based on the alkoxysilanes used.

16. The composition as claimed in claim 15, wherein
it has a content of from 12.5 to 30% by weight of silicon compounds at a pH of from 3.0 to 4.8.

17. The composition as claimed in claim 1, wherein
for the structural element containing C, an alkyl radical, c is $\geq 1$.

18. The composition as claimed in claim 17, wherein
the pH is less than 12.

19. The composition as claimed in claim 1, wherein
it is dilutable with water or with a water-soluble solvent.

20. The composition as claimed in claim 19, wherein
it can be diluted as desired.

21. A mixture comprising silane-based compositions and a composition as claimed in claim 1.

22. The mixture as claimed in claim 21, wherein
the mixture contains a composition comprising bis-aminofunctional silicon compounds together with a silane-based composition based on alkyl-, alkenyl-, aryl-, epoxy-, dihydroxyalkyl-, aminoalkyl-, polyalkylglycolalkyl-, haloalkyl-, mercaptoalkyl-, sulfanealkyl-, ureidoalkyl- or acryloyloxyalkyl-functional and/or tetraalkoxy-functional silanes and/or mixtures thereof.

23. The mixture as claimed in claim 21, wherein
the curing temperature of the mixture is lower than that of the silane-based composition.

24. A composition for hydrophobization, as corrosion protection, for rock consolidation and/or for oleophobization of substrate surfaces comprising the mixture as claimed in claim 21.

25. A composition for the hydrophobization of metal, glass, plastic, polymers, mineral surfaces, concrete, bricks, mortar, screed, sandstone, natural fibers, paper, wood, for the priming of glass surfaces, metal surfaces, mineral surfaces, concrete, mortar, screed, sandstone or natural fibers, paper, wood, as corrosion protection for metals, concrete, mortar and/or bricks and/or as an additive in aqueous coating or resin formulations or as an anti-fingerprint coating comprising the mixture as claimed in claim 21.

26. A composition for use as corrosion protection of untreated or pretreated metals or metal surfaces and galvanized metal surfaces comprising the mixture as claimed in claim 21.

27. A composition for modifying or for treating substrate surfaces and/or for building up a barrier layer on substrate surfaces comprising the composition as claimed in claim 1.

28. A coated or consolidated product comprising the composition as claimed in claim 27.

29. The product as claimed in claim 28, wherein
it is a steel reinforcement, a concrete pipe and/or a prefabricated concrete component.

30. A process for the preparation of a composition containing substantially water-soluble, bis-aminofunctional silicon compounds substantially free of alkoxy groups, and water and an acid, wherein water, an acid, optionally an alcohol and optionally a catalyst are initially introduced and
at least one bisaminoalkoxysilane of the formula II $$(OR^1)_3Si\text{-}A\text{-}Si(OR^1)_3 \qquad (II)$$

where A is a bis-aminofunctional group of the formula III $$-(CH_2)_f-[NH(CH_2)_f]_gNH[(CH_2)_{f*}NH]_{g*}-(CH_2)_{i*}- \qquad (III),$$

in which i, i*, f, f*, g or g* are identical or different, with i and/or i*=from 0 to 8, f and/or f*=1, 2 or 3, g and/or g*=0, 1 or 2 and $R^1$ corresponds to a linear, cyclic and/or branched alkyl radical having 1 to 4 C atoms, and/or the condensates thereof, and optionally
at least one aminoalkylalkoxysilane of the formula IV $$B-Si(R^3)_x(OR^2)_{3-x} \qquad (IV)$$

where x=0 or 1, $R^2$ corresponds to a linear, branched and/or cyclic alkyl radical having 1 to 4 C atoms and B corresponds to one of the following aminofunctional groups of the general formula Va or Vb $$R^{10}_{h*}NH_{(2-h*)}[(CH_2)_h(NH)]_j[(CH_2)_l(NH)]_n-(CH_2)_k- \qquad (Va),$$

in which $0 \leq h \leq 6$; h*=0, 1 or 2, j=0, 1 or 2; $0 \leq l \leq 6$; n=0, 1 or 2; $0 \leq k \leq 6$ and $R^{10}$ corresponds to a benzyl, aryl, vinyl or formyl radical and/or to a linear, branched and/or cyclic alkyl radical having 1 to 8 C atoms, and/or $$[NH_2(CH_2)_m]_2N(CH_2)_p- \qquad (Vb),$$

in which $0 \leq m \leq 6$ and $0 \leq p \leq 6$, and/or the condensates thereof, and optionally
at least one alkylalkoxysilane of the general formula VI $$C-Si(R^5)_y(OR^4)_{3-y} \qquad (VI)$$

where y=0 or 1, corresponds to a linear, branched or cyclic alkyl radical having 1 to 20 C atoms, $R^5$ corresponds to a linear, branched or cyclic alkyl radical having 1 to 12 C atoms and/or an aryl radical, and $R^4$ corresponds to a linear, branched and/or cyclic alkyl radical having 1 to 4 C atoms, and/or the condensates thereof, and optionally
at least one epoxy- or ether-alkoxysilane of the general formula VII $$D-Si(R^7)_u(OR^6)_{3-u} \qquad (VII)$$

where u=0 or 1, D corresponds to a 3-glycidyloxyalkyl, 3-glycidyloxypropyl, epoxyalkyl, epoxycycloalkyl or polyalkylglycolalkyl radical or to a polyalkylglycol-3-propyl radical, $R^7$ corresponds to a linear, branched or cyclic alkyl radical having 1 to 4 C atoms and $R^6$ corresponds to a linear, branched and/or cyclic alkyl radical having 1 to 4 C atoms, and/or the condensates thereof, and optionally at least one organofunctional alkoxysilane of the formula VIII

where v=0 or 1, $R^8$ corresponds to a linear, branched or cyclic alkyl radical having 1 to 4 C atoms, E corresponds to a radical $R^{8*}-Y_m-(CH_2)_s-$, with $R^{8*}$ corresponding to a mono-, oligo- or perfluorinated alkyl radical having 1 to 9 C atoms or to a mono-, oligo- or perfluorinated aryl radical, and Y corresponding to a $CH_2$, O, aryl or S radical, and m being 0 or 1 and s being 0 or 2, or to a vinyl, allyl or isopropenyl radical, mercaptoalkyl radical, sulfanealkyl radical, ureidoalkyl radical, to an acryloyloxyalkyl radical or to a linear, branched or cyclic alkoxy radical having 1 to 4 C atoms and $R^9$ corresponds to a linear, branched and/or cyclic alkyl radical having 1 to 4 C atoms, and/or the condensates thereof, are hydrolyzed and the alcohol is substantially removed.

31. The process as claimed in claim 30, wherein
the silanes of the general formulae II, IV, VI, VII and/or VIII, the condensates thereof and/or mixtures of these are added in aqueous and/or alcoholic solution.

32. The process as claimed in claim 30, wherein
the silanes of the general formula II, IV, VI, VII or VIII and/or the condensates thereof are added in succession or as a mixture.

33. The process as claimed in claim 30, wherein
the water content during the hydrolysis is from 50 to 90% by weight.

34. The process as claimed in claim 30, wherein
the pH is adjusted by further addition of an acid.

35. The process as claimed in claim 30, wherein
the silicon compounds are present altogether with a content of from 7.5 to 40% by weight.

36. The process as claimed in claim 30, wherein
the hydrolysis is carried out in an aqueous alcoholic solution at a pH below 12.

37. The process as claimed in claim 30, wherein
substantially unhydrolyzed bisaminoalkylalkoxysilane of the formula II is used.

38. The process as claimed in claim 30, wherein
a bisaminoalkylalkoxysilane of the formula II and an alkylalkoxysilane of the general formula VI are used.

39. The process as claimed in claim 30, wherein
the hydrolysis and optionally condensation are carried out at from 55 to 80° C.

40. The process as claimed in claim 30, wherein
inorganic fillers are added.

41. The process as claimed in claim 30, wherein
water is added and an alcohol/water mixture is removed until the composition is substantially free of alcohols.

42. The process as claimed in claim 30, wherein
the pH of the composition after removal of the alcohol is from 1.0 to 5.4.

43. The process as claimed in claim 42, wherein
the pH of the composition after removal of the alcohol is from 3.0 to 5.4.

44. The composition obtained as claimed in claim 30.

45. The process as claimed in claim 30, wherein
further water is added after addition of at least one silane.

46. The process as claimed in claim 45, wherein
the water content during the hydrolysis is from 65 to 90% by weight.

47. The process as claimed in claim 30, wherein
the pH during the hydrolysis is from 2.0 to 5.4.

48. The process as claimed in claim 47, wherein
the pH during the hydrolysis is from 3.0 to 5.4.

49. A process for the preparation of a composition containing substantially water-soluble, bis-aminofunctional silicon compounds substantially free of alkoxy groups, and water and an acid, wherein an aqueous solution of at least one water-soluble silane of the general formulae II, IV and/or VII or the water-soluble condensates thereof or the water-soluble hydrolysis products of a silane of the general formula VI is initially introduced, the silane of the formula II corresponding to a bisaminoalkoxysilane

where A is a bis-aminofunctional group of the formula III

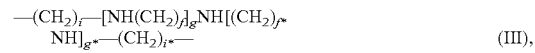

in which i, i*, f, f*, g or g* are identical or different, with i and/or i*=from 0 to 8, f and/or f*=1, 2 or 3, g and/or g*=0, 1 or 2 and $R^1$ corresponds to a linear, cyclic and/or branched alkyl radical having 1 to 4 C atoms, and/or the condensates thereof, the silane of the formula IV corresponding to an aminoalkylalkoxysilane

where x=0 or 1, $R^2$ corresponds to a linear, branched and/or cyclic alkyl radical having 1 to 4 C atoms and B corresponds to one of the following aminofunctional groups of the general formula Va or Vb

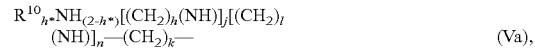

in which $0 \leq h \leq 6$; h*=0, 1 or 2, j=0, 1 or 2; $0 \leq l \leq 6$; n=0, 1 or 2; $0 \leq k \leq 6$ and $R^{10}$ corresponds to a benzyl, aryl, vinyl or formyl radical and/or to a linear, branched and/or cyclic alkyl radical having 1 to 8 C atoms, and/or

in which $0 \leq m \leq 6$ and $0 \leq p \leq 6$, and/or the condensates thereof, the silane of the formula VII corresponding to an epoxy- or ether-alkoxysilane

where u=0 or 1, D corresponds to a 3-glycidyloxyalkyl, 3-glycidyloxypropyl, epoxyalkyl, epoxycycloalkyl or polyalkylglycolalkyl radical or to a polyalkylglycol-3-propyl radical, $R^7$ corresponds to a linear, branched or cyclic alkyl radical having 1 to 4 C atoms and $R^6$ corresponds to a linear, branched and/or cyclic alkyl radical having 1 to 4 C atoms, and/or the condensates thereof, the silane of the formula VI corresponding to an alkylalkoxysilane $$C\text{—}Si(R^5)_y(OR^4)_{3-y} \qquad (VI)$$

where y=0 or 1, C corresponds to a linear, branched or cyclic alkyl radical having 1 to 4 C atoms, $R^5$ corresponds to a linear, branched or cyclic alkyl radical having 1 to 4 C atoms and/or an aryl radical, and $R^4$ corresponds to a linear, branched and/or cyclic alkyl radical having 1 to 4 C atoms, and optionally acid, optionally alcohol and optionally a catalyst and optionally one or more further silanes of the general formulae II, IV, VI, VII and/or VIII or the condensates thereof are added the added silane of the formula VI corresponding to an alkylalkoxysilane $$C\text{—}Si(R^5)_y(OR^4)_{3-y} \qquad (VI)$$

where y=0 or 1, C corresponds to a linear, branched or cyclic alkyl radical having 1 to 20 C atoms, $R^5$ corresponds to a linear, branched or cyclic alkyl radical having 1 to 12 C atoms and/or an aryl radical, and $R^4$ corresponds to a linear, branched and/or cyclic alkyl radical having 1 to 4 C atoms, the silane of the formula VIII corresponding to an organofunctional alkoxysilane $$E\text{-}Si(R^8)_v(OR^9)_{3-v} \qquad (VIII)$$

where v=0 or 1, $R^8$ corresponds to a linear, branched or cyclic alkyl radical having 1 to 4 C atoms, E corresponds to a radical $R^{8*}\text{—}Y_m\text{—}(CH_2)_s\text{—}$, with $R^{8*}$ corresponding to a mono-, oligo- or perfluorinated alkyl radical having 1 to 9 C atoms or to a mono-, oligo- or perfluorinated aryl radical, and Y corresponding to a $CH_2$, O, aryl or S radical and m being 0 or 1 and s being 0 or 2, or to a vinyl, allyl or isopropenyl radical, mercaptoalkyl radical, sulfanealkyl radical, ureidoalkyl radical, to an acryloyloxyalkyl radical or to a linear, branched or cyclic alkoxy radical having 1 to 4 C atoms and $R^9$ corresponds to a linear, branched and/or cyclic alkyl radical having 1 to 4 C atoms, and/or the condensates thereof, and are hydrolyzed and the alcohol is substantially removed.

50. A process for the preparation of a composition containing substantially water-soluble, bis-aminofunctional silicon compounds substantially free of alkoxy groups, and water and an acid, wherein an organic solvent, optionally water, optionally an acid and/or optionally a catalyst are initially introduced and at least one bisaminoalkoxysilane of the formula H $$(OR^1)_3Si\text{-}A\text{-}Si(OR^1)_3 \qquad (H)$$

where A is a bis-aminofunctional group of the formula III $$\text{—}(CH_2)_i\text{—}[NH(CH_2)_f]_g NH[(CH_2)_{f*} NH]_{g*}\text{—}(CH_2)_{i*}\text{—} \qquad (III),$$

in which i, i*, f, f*, g or g* are identical or different, with i and/or i*=from 0 to 8, f and/or f*=1, 2 or 3, g and/or g*=0, 1 or 2 and $R^1$ corresponds to a linear, cyclic and/or branched alkyl radical having 1 to 4 C atoms, and/or the condensates thereof, and optionally at least one aminoalkylalkoxysilane of the formula IV $$B\text{—}Si(R^3)_x(OR^2)_{3-x} \qquad (IV)$$

where x=0 or 1, $R^2$ corresponds to a linear, branched and/or cyclic alkyl radical having 1 to 4 C atoms and B corresponds to one of the following aminofunctional groups of the general formula Va or Vb $$R^{10}{}_{h*}\text{-}NH_{(2-h*)}[(CH_2)_h(NH)]_j[(CH_2)_l(NH)]_n\text{—}(CH_2)_k\text{—} \qquad (Va),$$

in which $0 \leq h \leq 6$; h*=0, 1 or 2, j=0, 1 or 2; $0 \leq l \leq 6$; n=0, 1 or 2; $0 \leq k \leq 6$ and $R^{10}$ corresponds to a benzyl, aryl, vinyl or formyl radical and/or to a linear, branched and/or cyclic alkyl radical having 1 to 8 C atoms, and/or $$[NH_2(CH_2)_m]_2N(CH_2)_p\text{—} \qquad (Vb),$$

in which $0 \leq m \leq 6$ and $0 \leq p \leq 6$, and/or the condensates thereof, and optionally at least one alkylalkoxysilane of the general formula VI $$C\text{—}Si(R^5)_y(OR^4)_{3-y} \qquad (VI)$$

where y=0 or 1, C corresponds to a linear, branched or cyclic alkyl radical having 1 to 20 C atoms, $R^5$ corresponds to a linear, branched or cyclic alkyl radical having 1 to 12 C atoms and/or an aryl radical, and $R^4$ corresponds to a linear, branched and/or cyclic alkyl radical having 1 to 4 C atoms, and/or the condensates thereof, and optionally at least one epoxy- or ether-alkoxysilane of the general formula VII $$D\text{-}Si(R^7)_u(OR^6)_{3-u} \qquad (VII)$$

where u=0 or 1, D corresponds to a 3-glycidyloxyalkyl, 3-glycidyloxypropyl, epoxyalkyl, epoxycycloalkyl or polyalkylglycolalkyl radical or to a polyalkylglycol-3-propyl radical, $R^7$ corresponds to a linear, branched or cyclic alkyl radical having 1 to 4 C atoms and $R^6$ corresponds to a linear, branched and/or cyclic alkyl radical having 1 to 4 C atoms, and/or the condensates thereof, and optionally at least one organofunctional alkoxysilane of the formula VIII $$E\text{-}Si(R^8)_v(OR^9)_{3-v} \qquad (VIII)$$

where v=0 or 1, $R^8$ corresponds to a linear, branched or cyclic alkyl radical having 1 to 4 C atoms, E corresponds to a radical $R^{8*}\text{—}Y_m\text{—}(CH_2)_s\text{—}$, with $R^{8*}$ corresponding to a mono-, oligo- or perfluorinated alkyl radical having 1 to 9 C atoms or to a mono-, oligo- or perfluorinated aryl radical, and Y corresponding to a $CH_2$, O, aryl or S radical and m being 0 or 1 and s being 0 or 2, or to a vinyl, allyl or isopropenyl radical, mercaptoalkyl radical, sulfanealkyl radical, ureidoalkyl radical, to an acryloyloxyalkyl radical or to a linear, branched or cyclic alkoxy radical having 1 to 4 C atoms and $R^9$ corresponds to a linear, branched and/or cyclic alkyl radical having 1 to 4 C atoms, and/or the condensates thereof, are hydrolyzed and the hydrolysis alcohol and the solvent are substantially removed.

51. The process as claimed in claim 50, wherein the solvent comprises at least one alcohol selected from the group consisting of methanol, ethanol, propanol and/or mixtures thereof.

52. The process as claimed in claim 50, wherein
the silanes of the general formulae II, IV, VI, VII and/or VIII, the condensates thereof and/or mixtures of these are added in aqueous and/or alcoholic solution.

53. The process as claimed in claim 50, wherein
the silanes of the general formula II, IV, VI, VII or VIII and/or the condensates thereof are added in succession or as a mixture.

54. The process as claimed in claim 50, wherein
substantially unhydrolyzed bisaminoalkylalkoxysilane of the formula II is used.

55. The process as claimed in claim 50, wherein
a bisaminoalkylalkoxysilane of the formula II and an alkylalkoxysilane of the general formula VI are used.

56. The process as claimed in claim 50, wherein
the pH during the hydrolysis is below 12.

57. The process as claimed in claim 50, wherein
inorganic fillers are added.

58. The process as claimed in claim 50, wherein
the hydrolysis and optionally condensation are carried out at from 55 to 80° C.

59. The process as claimed in claim 50, wherein
the pH after the hydrolysis and optionally condensation is adjusted to a value of from 1.0 to 7.0.

60. The process as claimed in claim 50, wherein
the pH is adjusted by addition of an acid.

61. The process as claimed in claim 50, wherein
water is added and a solvent/water mixture is removed until the composition is substantially free of solvent.

62. The process as claimed in claim 50, wherein
an alcohol is initially introduced and at least one bisaminoalkoxysilane of the general formula II and/or the condensate thereof are added and are hydrolyzed by addition of water and optionally an acid and are optionally condensed.

63. The process as claimed in claim 62, wherein
at least one alkylalkoxysilane of the formula VI and optionally at least one aminoalkylalkoxysilane of the formula IV, optionally at least one epoxy- or ether-alkoxysilane of the general formula VII and optionally at least one organofunctional alkoxysilane of the formula VIII and/or the condensates thereof are then added in succession or as a mixture.

64. The process as claimed in claim 50, wherein
the pH of the composition after removal of the hydrolysis alcohol and solvent is from 1.0 to 5.4.

65. The process as claimed in claim 64, wherein
the pH of the composition after removal of the hydrolysis alcohol and solvent is from 3.0 to 5.4.

66. The composition obtained as claimed in claim 50.

67. A process for the preparation of a composition containing substantially water-soluble, bis-aminofunctional silicon compounds substantially free of alkoxy groups, and water and an acid, wherein
at least one epoxy- or ether-alkoxysilane of the general formula VII $$D\text{-}Si(R^7)_u(OR^6)_{3-u} \qquad (VII)$$

where u=0 or 1, D corresponds to a 3-glycidyloxyalkyl, 3-glycidyloxypropyl, epoxyalkyl, epoxycycloalkyl or polyalkylglycolalkyl radical or to a polyalkylglycol-3-propyl radical, $R^7$ corresponds to a linear, branched or cyclic alkyl radical having 1 to 4 C atoms and $R^6$ corresponds to a linear, branched and/or cyclic alkyl radical having 1 to 4 C atoms, and/or the condensates thereof, and/or at least one alkylalkoxysilane of the general formula VI $$C\text{—}Si(R^5)_y(OR^4)_{3-y} \qquad (VI)$$

where y=0 or 1, C corresponds to a linear, branched or cyclic alkyl radical having 1 to 20 C atoms, $R^5$ corresponds to a linear, branched or cyclic alkyl radical having 1 to 12 C atoms and/or an aryl radical, and $R^4$ corresponds to a linear, branched and/or cyclic alkyl radical having 1 to 4 C atoms, and/or the condensates thereof, and/or at least one organofunctional alkoxysilane of the formula VIII $$E\text{-}Si(R^8)_v(OR^9)_{3-v} \qquad (VIII)$$

where v=0 or 1, $R^8$ corresponds to a linear, branched or cyclic alkyl radical having 1 to 4 C atoms, E corresponds to a radical $R^{8*}$—$Y_m$—$(CH_2)_s$—, with $R^{8*}$ corresponding to a mono-, oligo- or perfluorinated alkyl radical having 1 to 9 C atoms or to a mono-, oligo- or perfluorinated aryl radical, and Y corresponding to a $CH_2$, O, aryl or S radical, and m being 0 or 1 and s being 0 or 2, or to a vinyl, allyl or isopropenyl radical, mercaptoalkyl radical, sulfanealkyl radical, ureidoalkyl radical, to an acryloyloxyalkyl radical or to a linear, branched or cyclic alkoxy radical having 1 to 4 C atoms and $R^9$ corresponds to a linear, branched and/or cyclic alkyl radical having 1 to 4 C atoms, and/or the condensates thereof, are initially introduced and are at least partly hydrolyzed in the presence of water and in the presence of an acid and/or of a catalyst and water and optionally of a solvent and then, in a second hydrolysis step,
in the presence of further water and optionally of further acid,
at least one bisaminoalkoxysilane of the formula II $$(OR^1)_3Si\text{-}A\text{-}Si(OR^1)_3 \qquad (II)$$

where A is a bis-aminofunctional group of the formula III $$-(CH_2)_i-[NH[(CH_2)_f]_gNH[(CH_2)_{f^*}NH]_{g^*}-(CH_2)_{i^*}- \qquad (III),$$

in which i, i*, f, f*, g or g* are identical or different, with i and/or i*=from 0 to 8, f and/or f*=1, 2 or 3, g and/or g*=0, 1 or 2 and $R^1$ corresponds to a linear, cyclic and/or branched alkyl radical having 1 to 4 C atoms, and/or the condensates thereof, and optionally at least one aminoalkylalkoxysilane of the formula IV $$B\text{—}Si(R^3)_x(OR^2)_{3-x} \qquad (IV)$$

where x=0 or 1, $R^2$ corresponds to a linear, branched and/or cyclic alkyl radical having 1 to 4 C atoms and B corresponds to one of the following aminofunctional groups of the general formula Va or Vb

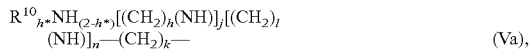
(Va), in which $0 \leq h \leq 6$; $h^*=0$, 1 or 2, $j=0$, 1 or 2; $0 \leq l \leq 6$; $n=0$, 1 or 2; $0 \leq k \leq 6$ and $R^{10}$ corresponds to a benzyl, aryl, vinyl or formyl radical and/or to a linear, branched and/or cyclic alkyl radical having 1 to 8 C atoms, and/or

(Vb), in which $0 \leq m \leq 6$ and $0 \leq p \leq 6$, and/or the condensates thereof, are added
and are hydrolyzed and the alcohol is substantially removed.

68. The process as claimed in claim 67,
wherein
the silanes of the general formulae VI, VII, VIII and/or the condensates thereof are added in succession or as a mixture.

69. The process as claimed in claim 67,
wherein
further water is added for the second hydrolysis step.

70. The process as claimed in claim 67,
wherein
the pH during the hydrolysis is from 2.0 to 5.4.

71. The process as claimed in claim 67,
wherein
the pH is adjusted by further addition of an acid.

72. The process as claimed in claim 67,
wherein
substantially unhydrolyzed bisaminoalkylalkoxysilane of the formula II is used.

73. The process as claimed in claim 67,
wherein
a bisaminoalkylalkoxysilane of the formula II and an alkylalkoxysilane of the general formula VI are used.

74. The process as claimed in claim 67,
wherein
inorganic fillers are added.

75. The process as claimed in claim 67,
wherein
water is added and an alcohol/water mixture is removed until the composition is substantially free of alcohols.

76. The composition obtained as claimed in claim 67.

77. The process as claimed in claim 67,
wherein
the pH of the composition after removal of the alcohol is from 1.0 to 5.4.

78. The process as claimed in claim 77,
wherein
the pH of the composition after removal of the alcohol is from 3.0 to 5.4.

* * * * *